United States Patent [19]
Etheredge

[11] Patent Number: 6,018,372
[45] Date of Patent: Jan. 25, 2000

[54] ELECTRONIC PROGRAM GUIDE WITH MULTIPLE DAY PLANNER

[75] Inventor: Robert C. Etheredge, Orinda, Calif.

[73] Assignee: Liberate Technologies, San Carlos, Calif.

[21] Appl. No.: 08/923,505

[22] Filed: Sep. 4, 1997

[51] Int. Cl.[7] ...................................................... H04N 5/50
[52] U.S. Cl. .......................................... 348/569; 348/906
[58] Field of Search ..................................... 348/906, 569, 348/563, 564, 570; H04N 5/50, 5/445

[56] References Cited

U.S. PATENT DOCUMENTS

| | | | |
|---|---|---|---|
| 4,706,121 | 11/1987 | Young | 358/142 |
| 4,977,455 | 12/1990 | Young | 358/142 |
| 5,353,121 | 10/1994 | Young et al. | 348/563 |
| 5,479,266 | 12/1995 | Young et al. | 358/335 |
| 5,479,268 | 12/1995 | Young et al. | 358/335 |
| 5,532,754 | 7/1996 | Young et al. | 348/569 |
| 5,550,576 | 8/1996 | Klosterman | 348/6 |

FOREIGN PATENT DOCUMENTS 0790738   8/1997   European Pat. Off. .

OTHER PUBLICATIONS

Sharp Video Cassette Recorder Operation Manual, Model VC–H923U/VC–A523U, 1993.
VideoGuide User's Manual, 1995.
Sony Digital Satellite Receiver Operation Manual, Model No. SAT–A2, 1996.

*Primary Examiner*—Sherrie Hsia
*Attorney, Agent, or Firm*—Fliesler, Dubb, Meyer & Lovejoy LLP

[57] ABSTRACT

A system and method for implementing an electronic programming guide that allows a television viewer to access and interact with television viewing information. The electronic programming guide provides the viewer with a grid which lists channels, titles and show times. One format for presenting the grid shows an entire week of programming. Each row contains a show that is to be broadcast one or more times during the week. The first column lists the name of the show and the second column indicates the length of the show. The next seven columns represent the days of the week. For each time that a show is to be broadcast, the show time and channel are displayed in the appropriate column. The grid can be sorted many ways including by title, category, actors or search terms.

41 Claims, 20 Drawing Sheets

| Name | Duration | Sun | Mon | Tue | Wed | Thur | Fri | Sat |
|---|---|---|---|---|---|---|---|---|
| Animal House | 2:30 | | | 7:00p (5) 9:00p (7) | | | | |
| Good, Bad and Ugly | 3:00 | | | | 9:00p (6) | 6:00a (6) | | |
| Gunsmoke | 1:00 | | 5:00p(9) | 5:00p (9) | 5:00p (9) | 5:00p (9) | 5:00p (9) | |

| | Name | Duration | Sun | Mon | Tue | Wed | Thur | Fri | Sat |
|---|---|---|---|---|---|---|---|---|---|
| 924 | Movies-Comedy | | | | | | | | |
| 926 | Animal House | 2:30 | | | 8:00p (12) 9:00p (7) | | | | |
| 928 | Movies-Western | | | | | | | | |
| 932 | Good, Bad and Ugly | 3:00 | | | | | 9:00p (22) | 6:00a (2) | |
| | Gunsmoke | 1:00 | | 5:00p(4) | 5:00p (4) | 5:00p (4) | 5:00p (4) | 5:00p (4) | |

934   936

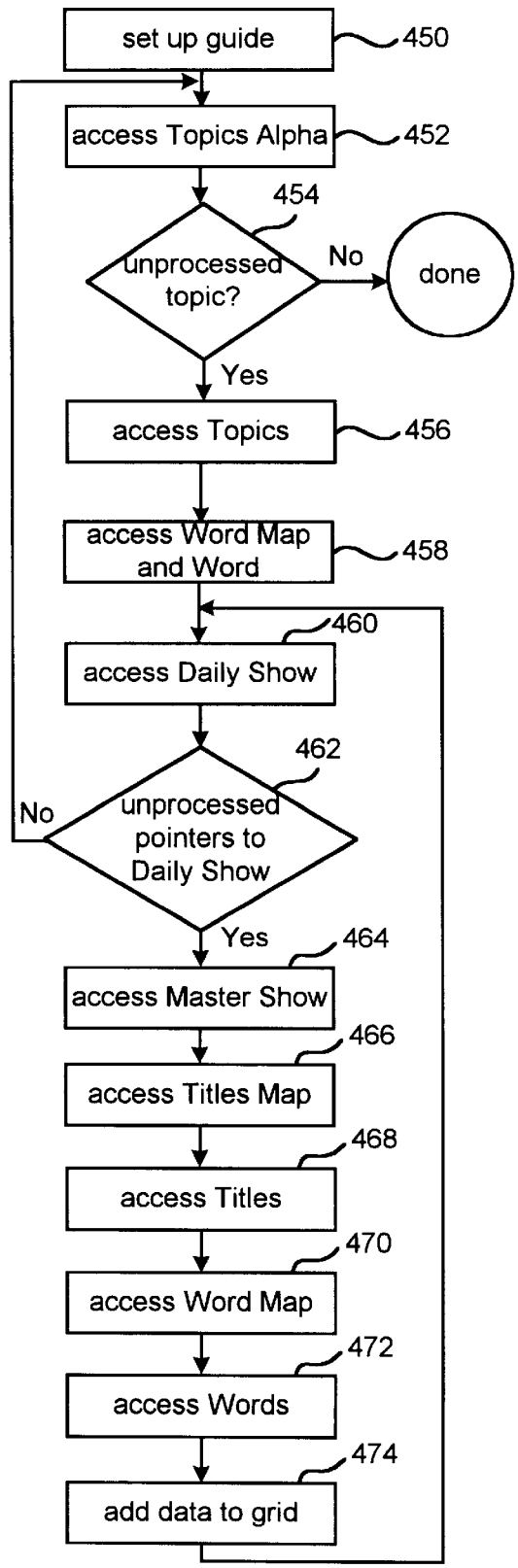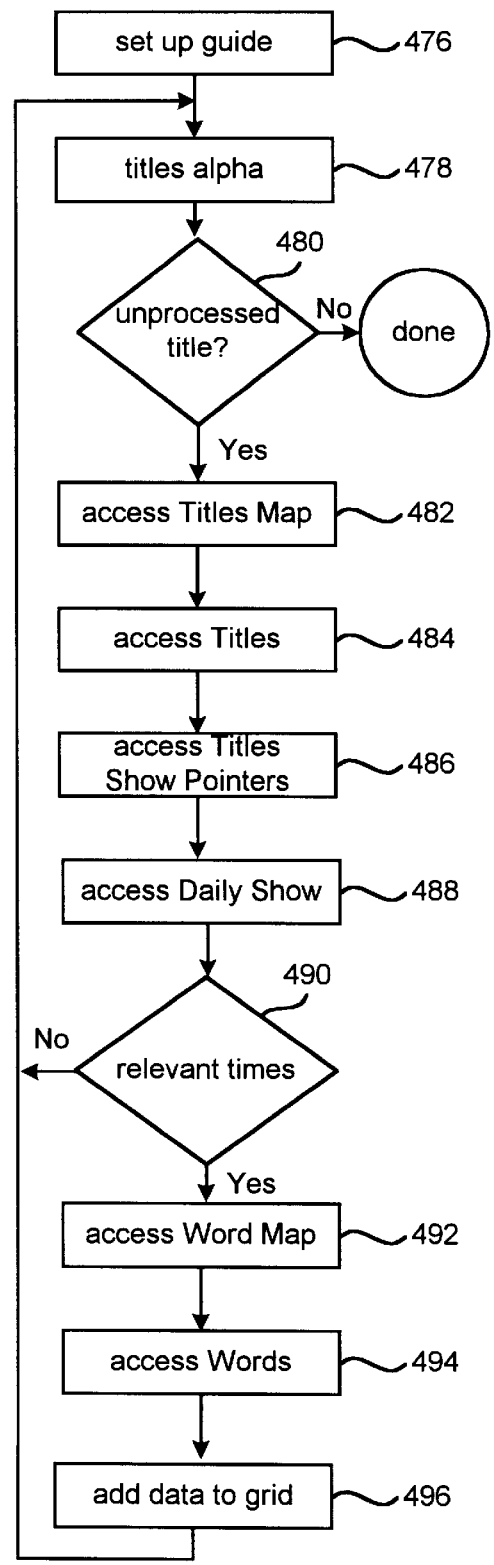
FIG. 10
FIG. 11

| Name | Duration | Sun | Mon | Tue | Wed | Thur | Fri | Sat |
|---|---|---|---|---|---|---|---|---|
| Animal House | 2:30 | | | 7:00p (5) 9:00p (7) | | | | |
| Good, Bad and Ugly | 3:00 | | | | 9:00p (6) | 6:00a (6) | | |
| Gunsmoke | 1:00 | | 5:00p (9) | 5:00p (9) | 5:00p (9) | 5:00p (9) | 5:00p (9) | |

FIG. 24

| | Name | Duration | Sun | Mon | Tue | Wed | Thur | Fri | Sat |
|---|---|---|---|---|---|---|---|---|---|
| 924 | Movies- Comedy | | | | | | | | |
| 926 | Animal House | 2:30 | | | 8:00p (12) 9:00p (7) | | | | |
| 928 | Movies- Western | | | | | | | | |
| 932 | Good, Bad and Ugly | 3:00 | | | | | 9:00p (22) | 6:00a (2) | |
| | Gunsmoke | 1:00 | | 5:00p (4) | 5:00p (4) | 5:00p (4) | 5:00p (4) | 5:00p (4) | |

| | Name | Duration | 7:00p | 7:30p | 8:00p | 8:30p | 9:00p | 9:30p |
|---|---|---|---|---|---|---|---|---|
| 924 | Movies- Comedy | | | | | | | |
| 926 | Animal House | 2:30 | | | 12 | | | |
| 928 | Movies- Western | | | | | | | |
| 932 | Good, Bad and Ugly | 3:00 | | | | | 22 | |
| | Gunsmoke | 1:00 | | | ■■■■■ | ■■■■■ | | |

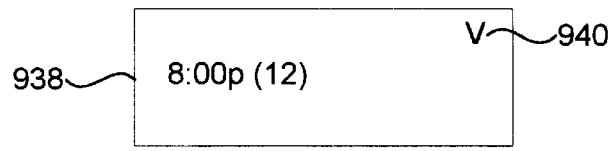
FIG. 27
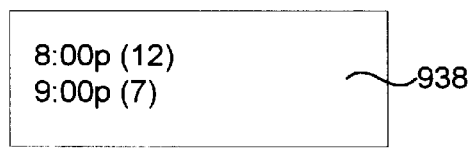
FIG. 28
| | Display shows that you: | | |
|---|---|---|---|
| Shows selected by | Like | Have no opinion | Dislike |
| 952 — View List | ● — 962 | ○ | ○ |
| 954 — Favorites | ● — 963 | ○ | ○ |
| 956 — Critics | ● | ○ | ○ |
| 958 — Agents | ● | ○ | ○ |
| 960 — Topics | ● | ○ | ○ |
| Higher Interest | 0    5    9 | | more shows |
234
FIG. 29

ELECTRONIC PROGRAM GUIDE WITH MULTIPLE DAY PLANNER

CROSS-REFERENCE TO RELATED APPLICATIONS

This Application is related to the following Applications:

System For Data Entry And Navigation in a User Interface, by Robert C. Etheredge, Ser. No. 08/917,325, filed on Aug. 25, 1997.

Smart Filtering, by Robert C. Etheredge, Ser. No. 08/918,767, filed on Aug. 25, 1997.

Each of these related Applications is incorporated herein by reference.

BACKGROUND OF THE INVENTION

1. Field of the Invention

The present invention is directed to an electronic program guide that allows a television viewer to access and interact with television viewing information.

2. Description of the Related Art

As the number of television stations provided on a cable system increase and satellite antennas become more popular, the multitude of television programming available to the viewer is increasing at a significant rate. Viewers must consult lengthy program guides in order to select programs for viewing. For example, if the viewer is interested in watching a particular program, the viewer may need to read a multitude of program listings in order to learn when and on what channel the particular program is being broadcast. Even electronic program guides provide no particular method for a viewer to easily determine when a particular show will be broadcast during a particular week.

In some cases, the viewer does not have a particular program in mind but is still interested in watching television. That viewer would need to sort through a large magnitude of information, including information relevant to shows that the viewer is not interested in. A more efficient method for the viewer to find a suitable program would allow the viewer to access a listing of programs sorted by category, title, actor name or other search criteria. The viewer would be able to restrict searching to the category the viewer is interested in.

However, current program guides are time/channel oriented. That is they display a grid of rows and columns. Each column represents a half hour interval and each row represents a channel. Sorting of television shows using these grids would require the use of many grids to display the scheduling information for an entire day or number of days. Since most display screens are not big enough to show multiple grids, accessing the sorted information would be cumbersome.

One method that reduces the number of grids includes sorting on a particular time slot. However, this method only provides access to scheduling information for a very limited time period and results in a hard-to-use programming interface.

To avoid the above described problems of using a grid, some programming guides show an alphabetical list of shows with the relevant show times. However, the lists can be lengthy and are displayed in a text format that is difficult to visually scan. Typically, a user would have to read more information than is necessary to find the desired show time.

Therefore, there is a need for a programming guide that allows a viewer to access programing information relevant to the viewer interest while reducing the amount of data the user must view.

SUMMARY OF THE INVENTION

The present invention, roughly described, includes a system for presenting scheduling information for a plurality of events. The system creates a table on a display. The table includes a plurality of sections, each section corresponds to an event and includes one or more subsections. Each subsection corresponds to a day such that said table is capable of displaying data for at least three days, preferably seven. The system inserts data into the table, including inserting event identifiers into one or more sections and event times into one or more subsections.

In one embodiment, the table includes rows and columns. The sections are rows and the subsections are cells within the rows. The subsections are defined by the columns. One columns of the table displays a list of programs and other columns list show times and channels for the listed programs.

The present invention is described in detail below in conjunction with an electronic program guide for use with television program information. However, the present invention can be used with electronic program guides or other information systems that utilize information other than television program information.

The present invention can be implemented in hardware, software or a combination of the two. When implemented in a combination of hardware and software, the software can reside on a processor readable storage medium.

These and other objects and advantages of the invention will appear more clearly from the following detailed description in which the preferred embodiment of the invention has been set forth in conjunction with the drawings.

BRIEF DESCRIPTION OF THE DRAWINGS

FIG. 6 is a flow chart of the method for providing data to the databases on the client.

FIG. 10 is a flow chart depicting the method for providing a guide listing shows by topic.

FIG. 11 is a flow chart depicting the method for providing a guide listing shows by titles.

FIG. 24 depicts a weekly planner grid.

FIG. 25 depicts a weekly planner grid sorted by topic.

FIG. 26 depicts a zoomed in grid sorted by topic.

FIG. 27 depicts one cell of a grid.

FIG. 28 depicts an expanded version of the cell of FIG. 27.

FIG. 29 depicts a slider in an expanded form.

DETAILED DESCRIPTION

An electronic program guide provides a user with up-to-date television programming information. The user will have customization options to tailor the listings to his or her preferences and to display the listings by different criteria. There can also be search capabilities and short cuts for viewing/recording programs.

Figure 1:
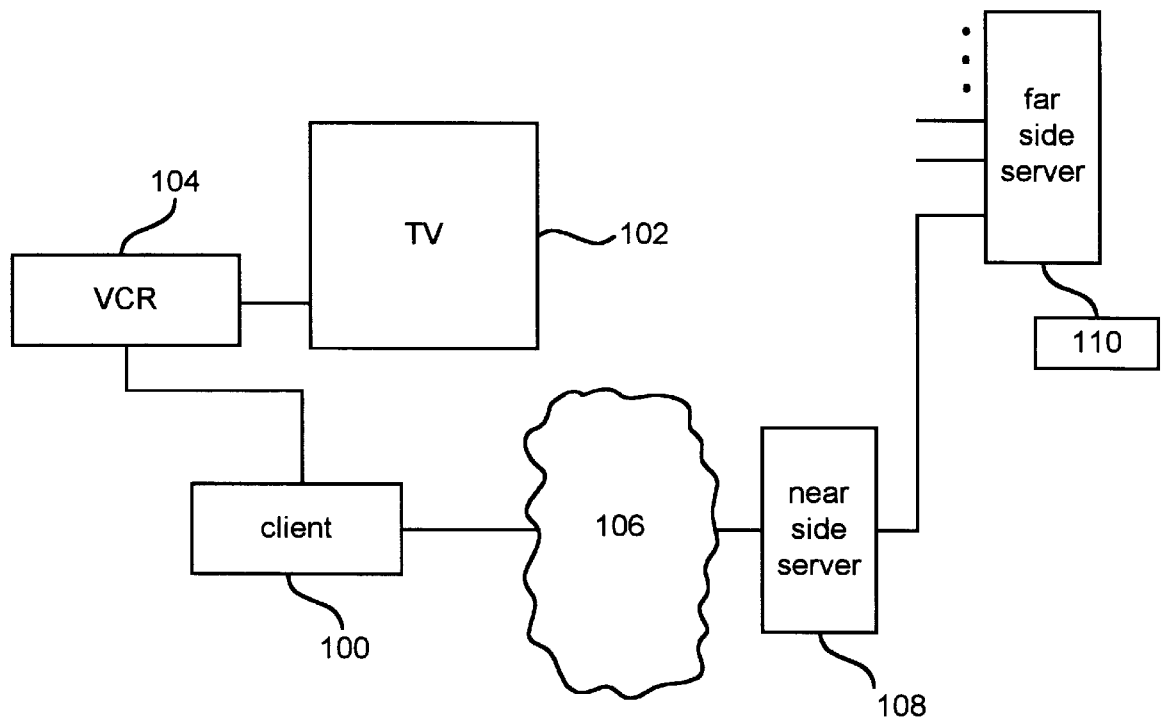
FIG. 1 is a block diagram of an exemplar hardware system that can implement an electronic program guide.

The electronic program guide can be implemented completely in hardware, in software, or a combination of hardware and software. In one embodiment, the electronic program guide is implemented as software on a computer. FIG. 1 depicts an exemplar hardware architecture that can be used to implement the electronic program guide. Client computer 100, which runs the software implementing the electronic program guide, is connected to a television 102 and a video recorder or VCR 104. The connection between client computer 100 and television 102 allows client computer 100 to tune and/or provide a television signal to television 102. The connection between client computer 100 and VCR 104 allows client computer 100 to tune/program and/or provide a video signal to VCR 104. Additionally, television 102 is connected to VCR 104. Client computer 100 is also connected to a communication system 106. In one embodiment, communication system 106 includes a telephone network and the Internet. In other embodiments, communication system 106 could include a network, the Internet without a telephone network, a dedicated communication system, a single connection to another computer or any other means for communicating with another electronic entity. Also connected to the communication system 106 is a near side server 108. In one embodiment, it is contemplated that there will be many near side servers connected to communication system 106. The near side servers may be situated so that there is one near side server for a predetermined number of clients. This can be accomplished by locating at least one near side server in each of a given number of geographical locations. All the near side servers are connected to far side server 110. It is contemplated that there may only be one far side server for an entire country or region of a country. Although the present invention is discussed with respect to near side server 108 and far side server 110, the present invention can be implemented without a far side server or a near side server.

Figure 2:
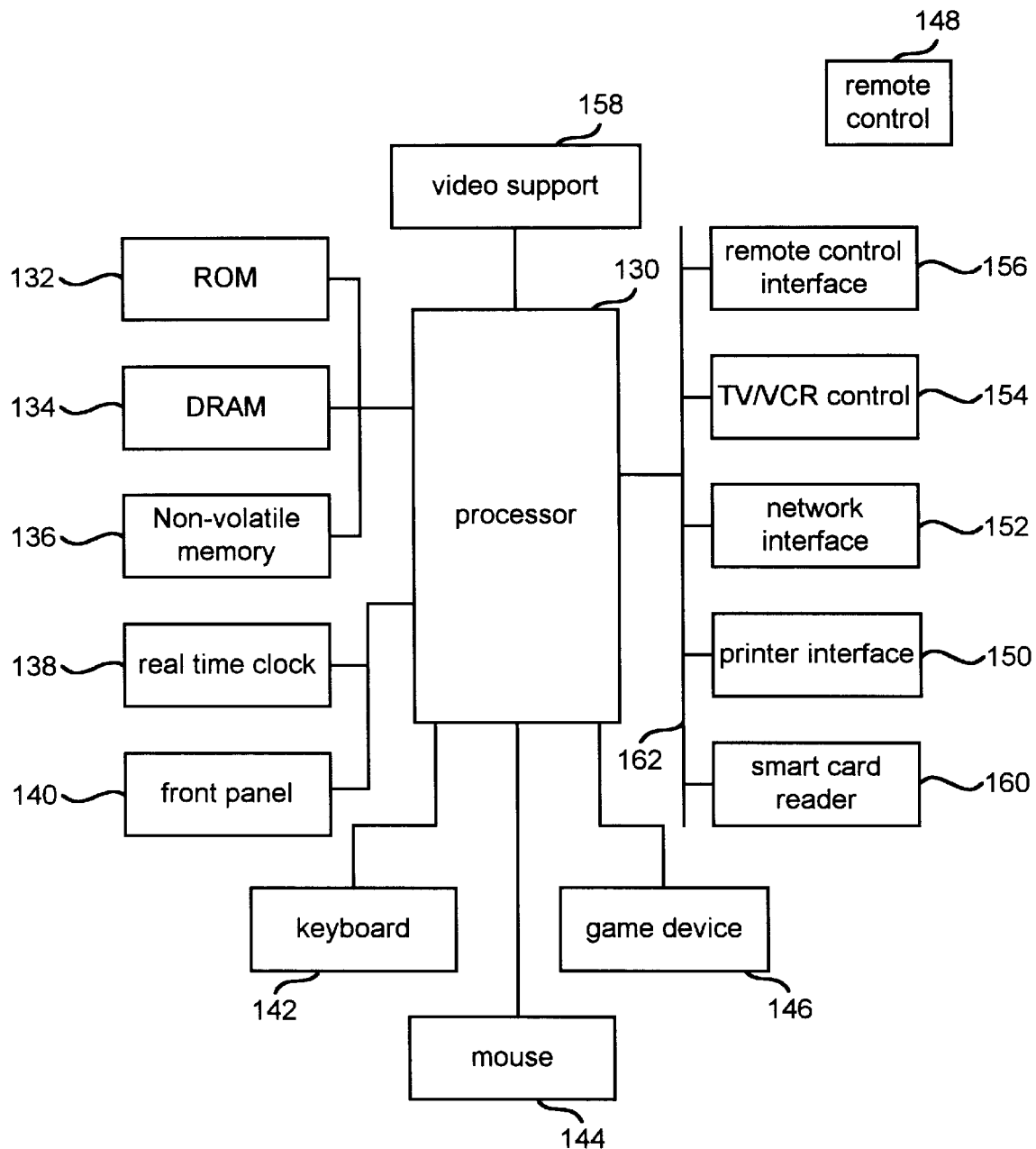
FIG. 2 is a block diagram of an exemplar client computer suitable for use with the system of FIG 1.

FIG. 2 depicts one exemplar hardware architecture for client computer 100. The computer of FIG. 2 is a network computer; however, the present invention may be implemented on a personal computer, other general purpose computer or a suitable special purpose computer. Client computer 100 includes a processor 130 which can be a Pentium class processor or other suitable processor. The exact processor used is not important to the present invention. Connected to processor 130 are three memories: ROM 132, DRAM 134 and non-volatile memory 136. ROM 132 is used to store system information including BIOS. DRAM 134 is the main memory used by the processor. Non-volatile memory 136 is used to store program code including native operating system code and software used to implement the present invention. Processor 130 also is connected to a real time clock 138 and front panel 140 to display status information.

Client computer 100 has a number of input devices including keyboard 142, mouse 144, game device 146 and remote control 148. Keyboard 142 is a standard PC keyboard. Mouse 144 can include a standard mouse or other pointing device. Game device 146 can be a joy stick or other game device. In some embodiments, client computer 100 can be implemented with only a subset of the above listed input devices.

Remote control 148 communicates with remote control interface 156 via infrared communication, RF communication or other suitable means. Remote control 148 is similar to a standard television remote. Remote control 148 includes a number of items. An item is a button, touch pad, dial, nob or any other control found on a remote control that can be used to provide input. In one embodiment, remote control 148 includes the following buttons: numbered buttons for 0–9, "OK" button, left arrow button, right arrow button, up arrow button, down arrow button, guide button, menu button, clear button, home button, info button, go-back button, page up button, page down button, volume up button, volume down button, who button, play button, record button and pause button. The "OK" button selects a highlighted choice on the screen. The arrow buttons are used to navigate between selections or cells on the screen. The guide button is used to show the guides discussed below. The menu button can be used to toggle between focus areas on the screen. The clear button is used to cancel the current mode of display. The home button is used to access a user's home page on the Internet. The info button is used to show an info dialog about a show that is highlighted. The go-back button is used to cycle through shows marked by the viewer. The page up and page down buttons are used to scroll the screen. The volume buttons are used to move the slider discussed below. The who button is used to cycle through the user names and provide a password dialog if needed. Although all of these buttons mentioned above can be found on a remote control, to save costs it may be advantageous to provide client computer 100 with a remote control 148 having a reduced number of buttons or items.

Processor 130 is also connected to video support 158. Client computer 100 can be connected to a television, a computer monitor or other display device. Video support 158 is used to interface between a display device and processor 130. Also connected to processor 130 is a bus 162. Connected to bus 162 is printer interface 150, network interface 152, TV/VCR control 154, remote control interface 156 and smart card reader 160. Printer interface 150 is used to interface client computer 100 with a printer. Network interface 152 is used to interface client computer 100 with communication system 106. Thus, network interface 152 could include a modem, network card or other communication device. TV/VCR control 154 is used to connect and control television 102 and/or VCR 104. Remote control interface 156 is used to communicate with remote control 148. Smart card reader 160 is used to read a smart card. In one embodiment, client computer 100 is a network computer and the smart card is a non-volatile memory device, approximately the size of a credit card, used to store information about a user and services utilized by that user. By plugging the smart card into smart card reader 160, client computer 100 is configured to operate with the user's configurations and allows the user to access services via communication system 106. Although a smart card may be used on a network computer, the smart card is not necessary to implement the present invention. One feature of the network computer of FIG. 2 is that it does not contain disk drives. Thus, the first time client computer 100 is powered on with the intention to use the electronic program guide of the current invention, client computer 100 downloads electronic program guide software from near side server 108. After downloading the software to operate the electronic program guide, client computer 100 downloads television programming information.

For purposes of simplicity, the components of the system shown on FIG. 2 are connected either directly to processor 130 or via single bus 162. However, the computer system components may be connected through one or more data transport means. For example, processor 130 may be connected to one or more busses and various elements can be connected to these busses. The components depicted in FIG. 2 are intended to represented a broad category of computer components that are well known in the art. Numerous other computer systems can also suffice such as various IBM compatible stand alone computers, Macintosh base computers, systems with different bus configurations, network systems, multiprocessor systems, work stations, mainframes, hard wired circuits that do not use a processor, and so on. When using electronic programming guide software with computers having disks, the software can be stored on the disks or any other computer readable memories.

Figure 3:
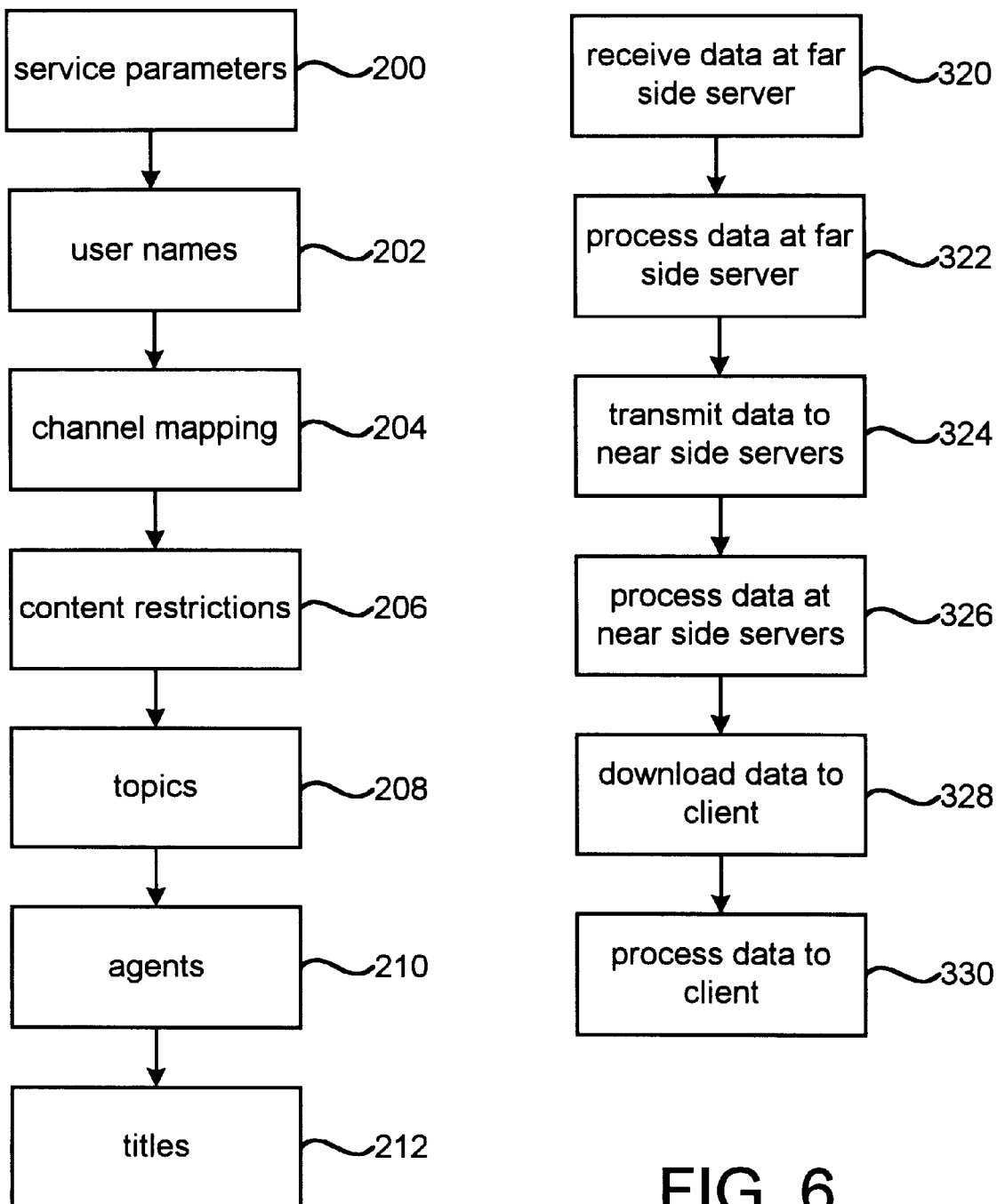
FIG. 3 is a flow chart explaining the method of configuring the electronic program guide and entering user profile information.

FIG. 3 depicts a method of configuring the electronic program guide. In step 200, client computer 100 presents the user with a dialog asking for various service parameters. The service parameters include the user's zip code, television provider, television provider plan, connection and download options. In one embodiment, after the user enters a zip code client computer 100 presents the user with a group of choices for the television provider. The television provider could include cable companies and/or satellite signal providers. Service plans include the different levels of cable or satellite service, e.g. basic cable and/or premium channels. The connection would specify whether the user is utilizing a cable box, simple cable connection, satellite dish, etc. The download options allow the user to choose when the client should update the data for the electronic program guide. The parameters specified during step 200 can be stored in non-volatile memory 136. In step 202, client computer 100 provides the user with a dialog box to enter user names for people utilizing the electronic program guide. Each user is also given the option to enter a password. In step 204, a list of channels is provided. The list of channels is determined by client computer 100 based on the information provided in step 200. Access to each channel can be turned on or off for a particular user. Thus, a parent can set up the electronic program guide so that children cannot access certain channels. During step 204 a map is created which shows which channels may be accessed by which users.

In step 206, a dialog box is provided to allow content restrictions to be implemented. That is, the electronic program guide can be configured to prevent certain users identified from viewing certain content. For example, children can be prevented from viewing nudity or adult language programs. In step 208, a list of topics are provided. Each user identified in step 202 can indicate for each topic whether they like that topic, don't care about that topic, or don't like that topic. In step 210, each user is provided with opportunity to input search agents. The search agents are key words that can be used to search the television programming information. For example, if your child is interested in dinosaurs, the child can enter in the word "dinosaur" as an agent. The system can be configured to search through the television programming information for any program that has the word dinosaur in its title, list of actors, list of characters or description. In step 212, each user identified in step 202 is provided with the opportunity to list titles of shows that they want to view, that they like or that they dislike.

Figure 4:
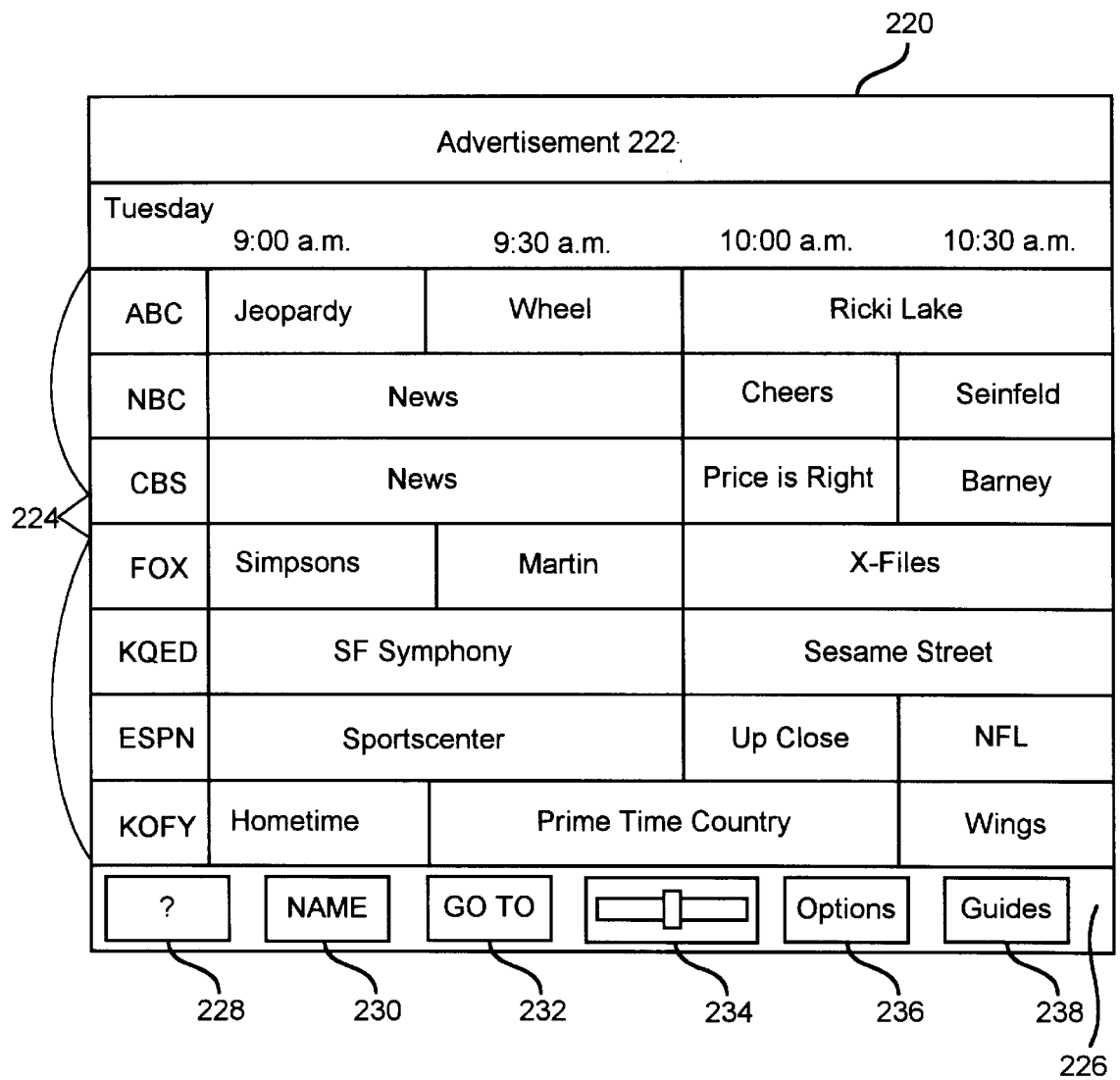
FIG. 4 depicts a television listings guide displayed by the electronic program guide.

FIG. 4 depicts a television listings guide 220 which is displayed by the electronic program guide. Guide 220 includes an advertisement 222, a grid 224 and a menu bar 226. In its most general sense, grid 224 is a listing of television programs. Grid 224 can be displayed in many different formats. FIG. 4 shows a standard channel guide format. That is, the left hand column of grid 224 lists channels. The columns to the right of the list of channels displays the shows playing on the listed channels over the next two hours. Each row is broken up into four half hour columns, starting at the time selected or the current system time. Each half hour time slot corresponding to a column and row is called a cell. For example, the row corresponding to the channel ABC shows three television programs. "Jeopardy" is on at 9:00, "Wheel of Fortune" is on at 9:30 and "Ricki Lake" is on at 10:00. The title "Jeopardy" occupies one cell, the title "Wheel of Fortune" occupies another cell and the title "Ricki Lake" occupies two cells.

If the user wants to know what show is on a particular channel, the user simply looks down the left hand column until the user finds the particular channel the user is interested in. The user then scans the row designated by that channel to the proper time slot (or cell) to see what program is on that particular channel at the particular time the user is interested in. For example, "SportsCenter" is being shown on ESPN from 9:00 to 10:00 a.m. The current day of the week is displayed in the upper left hand corner.

Menu bar 226 includes six items. In the context of a screen displayed by the electronic program guide, an item is anything that can be selected on the screen. Menu bar 226 includes help button 228, name button 230, go to button 232, slider 234, options button 236 and guides button 238. Help button 228 is used to get user help information. Name button 230 is used to select a particular user profile created in steps 202–212. Go to button 232 is used to direct the electronic program guide to specific data. Slider 234 is used to filter data and will be discussed below. Options button 236 is used to change user options. Guides button 238 is used to change the format of grid 224. Each of the buttons of menu bar 226 will be discussed in more detail below.

Figure 5:
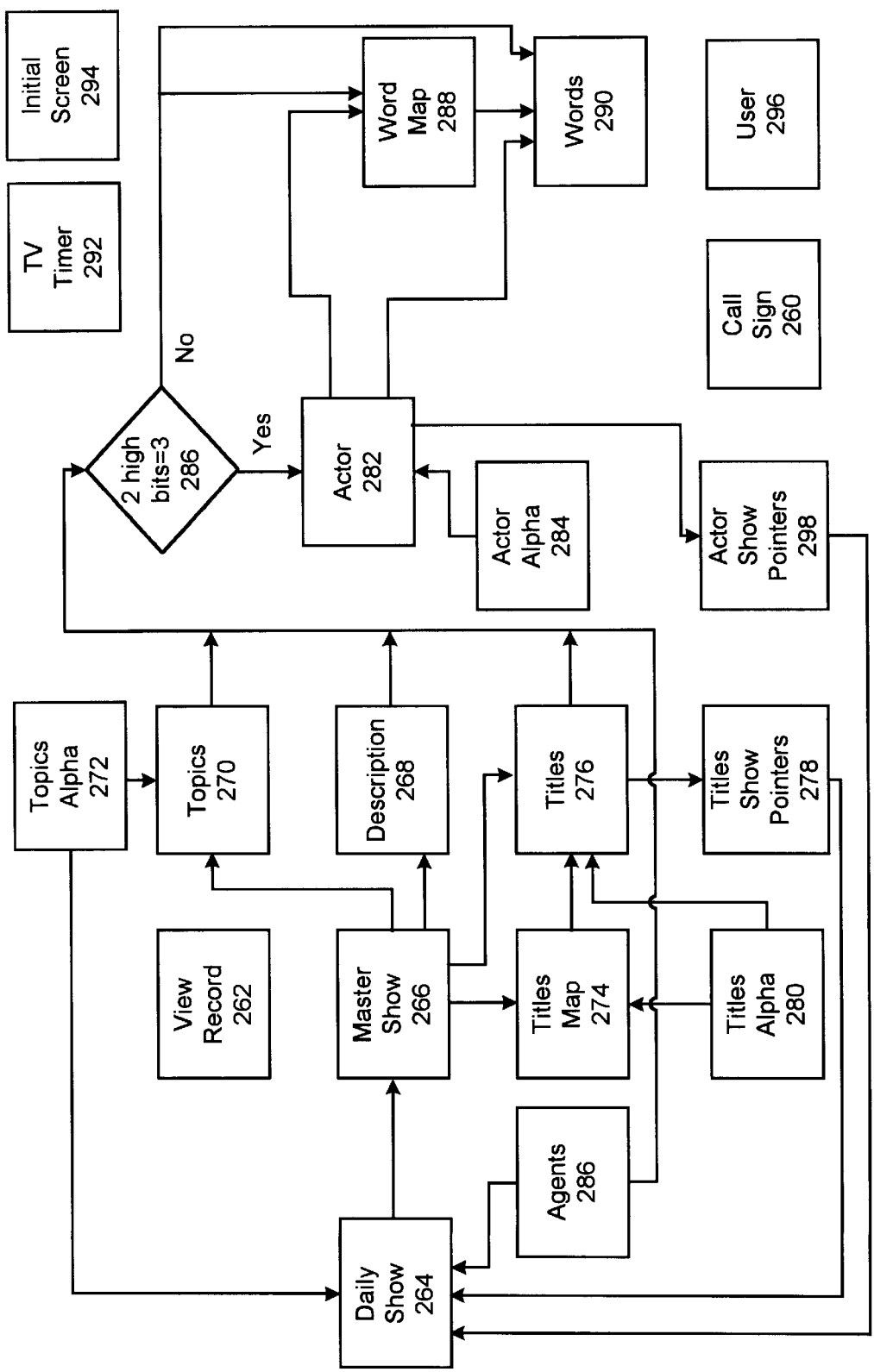
FIG. 5 depicts a symbolic representation of the databases used by the electronic program guide.

FIG. 5 depicts a symbolic representation of the databases used by the electronic program guide to store and utilize the television programming information. Each box represents a set of data and each line with an arrow represents a pointer. Call Sign database 260 is used to keep track of the stations available to a user. Thus, Call Sign database 260 stores the station type, a satellite I.D., member codes, channel number, affiliate station and an optional logo bitmap for the station. The station type indicates whether the station is broadcast, cable, pay-per-view, music, etc. The satellite I.D. identifies the particular satellite of origin. Member code is a bit flag indicating whether a particular user can view this channel as defined in step 204 of FIG. 3. The channel number is the actual number on the user's television mapped to that particular channel. The affiliate station is an optional network of affiliation, e.g. FOX, ABC, etc.

View Record database 262 is used to indicate whether a particular show has been marked by a user to be viewed or recorded. The system is capable of tracking shows for seven users. The View Record database 262 includes a record for each channel. Each channel's record includes one byte for each half hour time slot. Thus, there are 48 bytes per day for each channel and 7×48 bytes per week for each channel. For each byte, bit 0 is at logic level one if that show has been selected for recording. Bits 1 through 7 are allocated for the various users of the system. Thus, each user defined in step 202 is given a user number 1 through 7. If the corresponding bit is set, then that particular show has been selected for viewing by that particular member.

Daily Show database 264 is used to track which shows are being broadcast at what times and on what channels. The database includes a record for each channel. Each record includes two bytes for each half hour time slot. Thus, each day is represented by forty eight 2 byte slots and each record contains 7×96 bytes. For each time slot, one bit of the two associated bytes is used to indicate whether the show is being broadcast with closed captioning and one bit is used to determine whether the show is in stereo. The remaining 14 bits are used as a pointer into Master Show database 266.

Master Show database 266 is a master listing of all shows and episodes. Master Show database 266 includes a record for each show. Each record includes a pointer to Topics database 270, Description database 268, and the titles database (which includes Titles Map database 274 and Titles database 276). Each record can also include one bit for each member to indicate whether the particular program satisfies a search using that member's agents.

Description database 268 includes a description of each show in Master Show database 266. Thus, there is a record for each show in the Master Show database 266. Each record includes a value indicating the number of words in the description and a pointer to the word databases for each of those words.

Topics database 270 stores a list of topics. Each topic has a separate record. Each record includes a number of pointers to the word databases and a two bit member code for each of the seven members. The member code is equal to zero if the member does not like the topic, one if the member does not care and two if the member likes the topic. Topics Alpha database 272, which is used to provide an alphabetical list of topics, includes pointers into Topics database 270 and Daily Show database 264.

The titles of shows are stored in tables. Each table includes up to 256 titles. The titles are arranged into the tables according to the number of words in the title. Each title in a given table has the same number of words in the title. Thus, there is a table for titles with one word, a table for titles with two words, a table for titles with three words, etc. Titles Map database 274 contains a record for each table of titles. The record includes a start address in memory for the particular table (e.g. a pointer to Titles database 276), the number of words in the table up to 256 words and the length of the words in the table. Titles database 276 includes the tables. Each table includes a record for each show stored in the table. Each record includes two bits for each member which are used to record whether each member marked the program as one they like, don't like or don't care. Each record also includes a number of offsets into the word tables discussed below. Each record also includes a pointer into the Title Show Pointers database 278 which contains a variable list of pointers to Daily Show database 264 for the actual channel/time that the show is to be broadcast. There is one pointer for each occurrence of the title in the two week period being stored. Titles Alpha database 280 includes pointers into the Titles Map database 274 and Titles database 276. The pointers are stored according to alphabetical order of the titles.

Agents database 286 includes a record for each search agent set up by any user. Each record includes a number of pointers into the word databases, which represents the words to be searched for. If a user sets up a search agent that includes words not in the words databases, then the new words will be added to the words database. Each record will also include a flag indicating which member is using the agent. Additionally, the record includes pointers to Daily Show database 264 to indicate which shows meet the agent criteria. In one embodiment, if multiple words are entered as the agent, the system will treat different words as if being logically connected by an AND operator. Punctuation and certain small words can be ignored. In one embodiment, when allowing a user to enter an agent, the system can provide the user with a list of existing words.

There are references (pointers) to words throughout the software. For example, Description database 268, Topics database 270, Titles database 276 and Agents database 286 all include references to words. The system will look at the two high order bits of the reference. If these two high order bits are both equal to logical 1 (e.g. decimal 3) then the system concludes that the references are pointing to an actor/actress name, otherwise, the system assumes that the reference is for a word. Words can be used for titles, descriptions, categories, etc.

References to words are used to access Word Map database 288. Words are stored in tables, with each table including words of the same character length. Word Map database 288 includes a record for each table. Each record describes the length of the words in the particular table, the start address of the particular table in memory and the actual number of words in the table. The maximum number of words per table is 256 words. Word database 290 includes tables of words pointed to by Word Map database 288.

A reference to an actor's/actress' name accesses Actor database 282. For simplicity, the actor's names are stored as words in the Word database 290. Thus, Actor database 282 includes pointers to the Word Map database 288 and Word database 290. Actors database 282 also includes a reference to Actor Show Pointers database 298, which contains pointers to Daily Show database 264 for the actual channel/time of the programs having the referenced actors. Actors Alpha database 284 contains pointers into Actors database 282. The pointers in Actor Alpha database 284 are stored according to an alphabetical listing of actor names.

The electronic program guide allows the user to highlight shows and select them for later recording or viewing. TV Timer database 292 stores the information indicating which shows are to be recorded or viewed. Initial Screen database 294 stores the information used to draw the initial screen which is presented to the user prior to showing the guide of FIG. 4. The initial screen usually includes paid advertisements for shows that will be broadcast on the current day or very soon thereafter. User Profile database 296 stores user profile information.

FIG. 6 is a flowchart displaying how data is provided to the databases of FIG. 5. In step 320, television data is received at far side server 110. The television data includes show times, channels, titles, actors, some category information, some description information, actors in the show, episode identifiers, etc. In step 322, the data is put into databases similar to that shown on FIG. 5. A subset of the data is then transmitted to near side server 108 in step 324. Since near side server 108 is only used to service clients in a predetermined geographic area, only data for that geographic area need be downloaded to a particular near side server. At the near side server, additional category, description and advertisement information will be added to the data in step 326. Additionally, data could be subdivided into subgeographic regions or based on cable companies, satellite companies, etc. Near side server 108 maintains the data and is responsible for constantly updating the data from far side server 110 to ensure that the data on near side server 108 is up to date. Additionally, critic information can also be added at the near side server 108. In step 328, data is downloaded to client computer 100. Step 328 occurs the first time the client is engaged to run the electronic program guide. Thereafter, step 328 is performed routinely to keep the databases on client computer 100 up to date. In one embodiment, step 328 can be performed every evening. Alternatives include multiple downloads per day, downloads during off peak times or any other scenario that enables client computer 100 to maintain up to date database. In step 330, client computer 100 will process the data to update all the databases depicted in FIG. 5.

Figure 7:
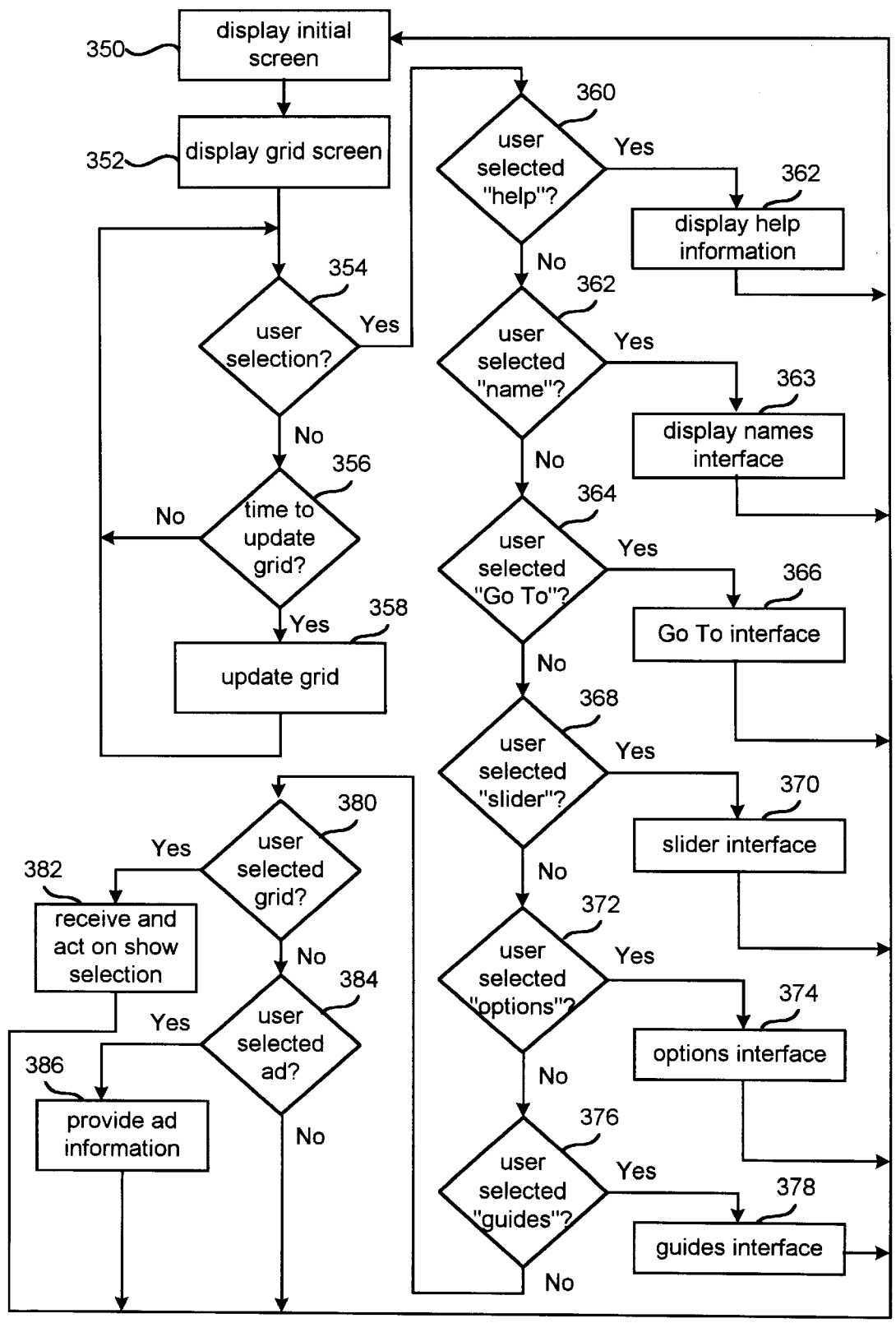
FIG. 7 is a flow chart illustrating the behavior of the electronic program guide based on user interaction with the guide of FIG. 4.

FIG. 7 is a flowchart which explains the basic operation of the electronic program guide. In step 350, the initial screen is displayed. The initial screen includes paid advertisements for television programs and, possibly, other products and services. The initial screen may be displayed for a predetermined amount of time or may be displayed until a user takes a specific action. In step 352, the guide of FIG. 4 is displayed. At that point, the user is provided the opportunity to make a selection. As discussed above with respect to FIG. 4, the user can choose help button 228, name button 230, go to button 232, slider 234, options button 236, guide button 238, grid 224 or advertisement 222. The system is constantly checking to see if the user entered a selection (step 354). If the user has not made a selection, the system determines whether it is time to update the grid (step 356). The grid needs to be updated at least every half hour so that the time period shown in the grid are for the current time and the next three half hour spots. If it is not time to update the data in the grid, the system loops back to step 354. Otherwise, the system updates the grid in step 358 and loops back to step 354.

If the user made a selection in step 354, then the system acts on the selection. If the user selected help button 228 (step 360) then help information is displayed in step 362. If the user selected name button 230 (step 361), then a name interface is displayed in step 363. If the user selected go to button 232 (step 364), then a go to interface is provided in step 356. If the user selected slider 234 (step 368) then the slider interface is provided. If the user selected options button 236 (step 372), then an options interface 374 is provided. If the user selected guides button 238 (step 376), then a guides interface is provided in step 378. If the user selected grid 224 in step 380, the user is allowed to select a particular show in step 382. That is, the user can select one of the shows on the grid and mark (or tag) that show for viewing or recording. If the user had selected advertisement 222 (step 384) then additional advertisement information is provided in step 386.

Name Interface 363 allows the system to change user profiles from one user to another. Go to interface 366 allows the user to quickly go to another place or time in the electronic program guide. The user is given a choice to go to a time, channel/call sign, topic, title or actor/actress. If the user chooses go to a time, the user can change the two hour time period displayed by the grid. In the go to channel/call sign option the user can choose a channel or call sign and the grid will display programming information for that channel or call sign. Selecting go to topic, go to title or go to actor allows the user to enter a topic/title/actor and the grid will display programming information for the entered topic/title/actor. Options interface 374 allows the user to change the appearance of the grid. For example, the user can change the colors of the display, the font, font size, number of lines displayed, the number of time periods displayed, etc.

When the user selects guides button 238, guides interface 378 provides the user with the opportunity to select one of seven guides. Five of the guides are similar to the grid shown in FIG. 4. The sixth guide, called the best bets guide, is the initial screen discussed above with respect to step 350. The seventh guide is a planner guide used to allow the user to enter information for recording programs. The five guides that include displays similar to FIG. 4 include channel guide, agent guide, topic guide, title guide and people guide. The channel guide is a list of television programming information listed by channel, as depicted in FIG. 4. The agent guide is a listing of television programming information listed by agent. Each of the agents designated by a user will be listed in the left hand column. Underneath the agent designator will be a list of shows, channels and show times meeting the particular agent. The topic guide is a listing of shows by topic. The title guide is an alphabetical listing of shows, channels and show times. The people guide is a list of shows, channels and show times which include actors designated by the user. FIGS. 8 through 12 describe the method of providing the five guides discussed above.

Figure 8:
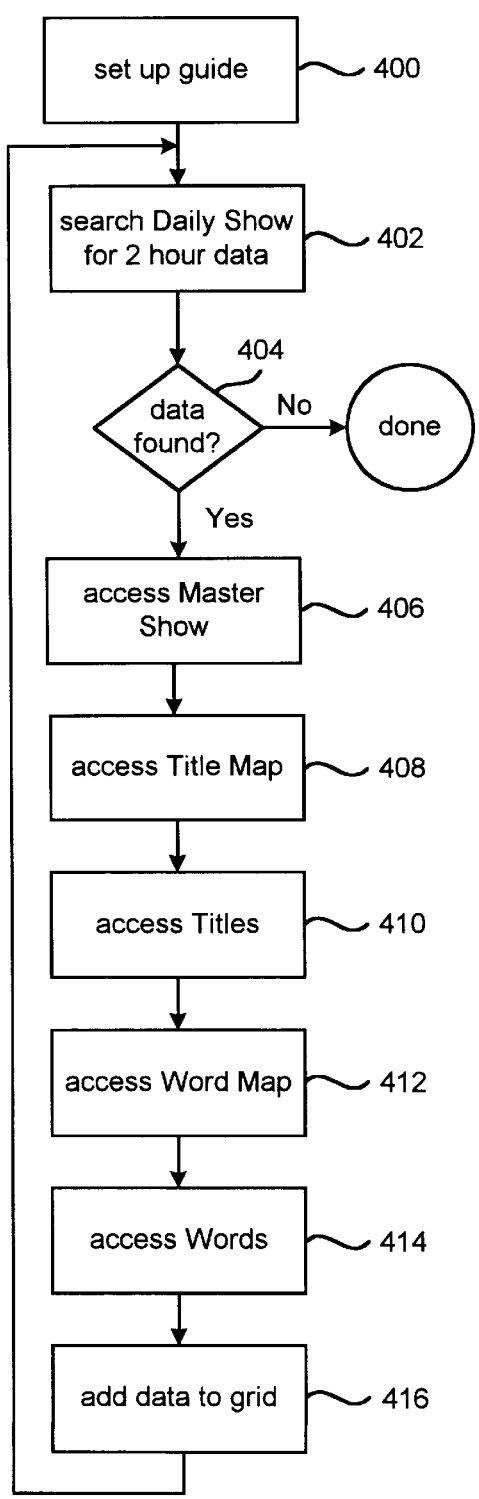
FIG. 8 is a flow chart depicting the method for providing the guide of FIG. 4.

FIG. 8 is a flowchart describing how the channel guide of FIG. 4 is provided. In step 400, the guide is set up without placing television programming data in the grid. In step 402, the system searches Daily Show database 264 for a record within the two hour time period being displayed in the grid. If a record is found, the system proceeds to step 406; otherwise, the method is done. The record found in step 402 includes a pointer to Master Show database 266. In step 406, the system uses that pointer to access Master Show database 266. The record accessed in Master Show database 266 will include a pointer to Titles Map database 274 and Titles database 276. In step 410, the title is accessed using the pointers discussed above with respect to step 408. The accessed title record includes pointers which are used to access the Word Map database 288 and Words database 290 in step 412 and 414, respectively. In step 416, the title accessed from Words database 290 is placed into the grid at the time and channel read from Daily Shows database 264. The system then loops back to step 402 and searches the Daily Show database 264 for another record. If another record is found, the system continues to step 406; otherwise, the method is done.

Figure 9:
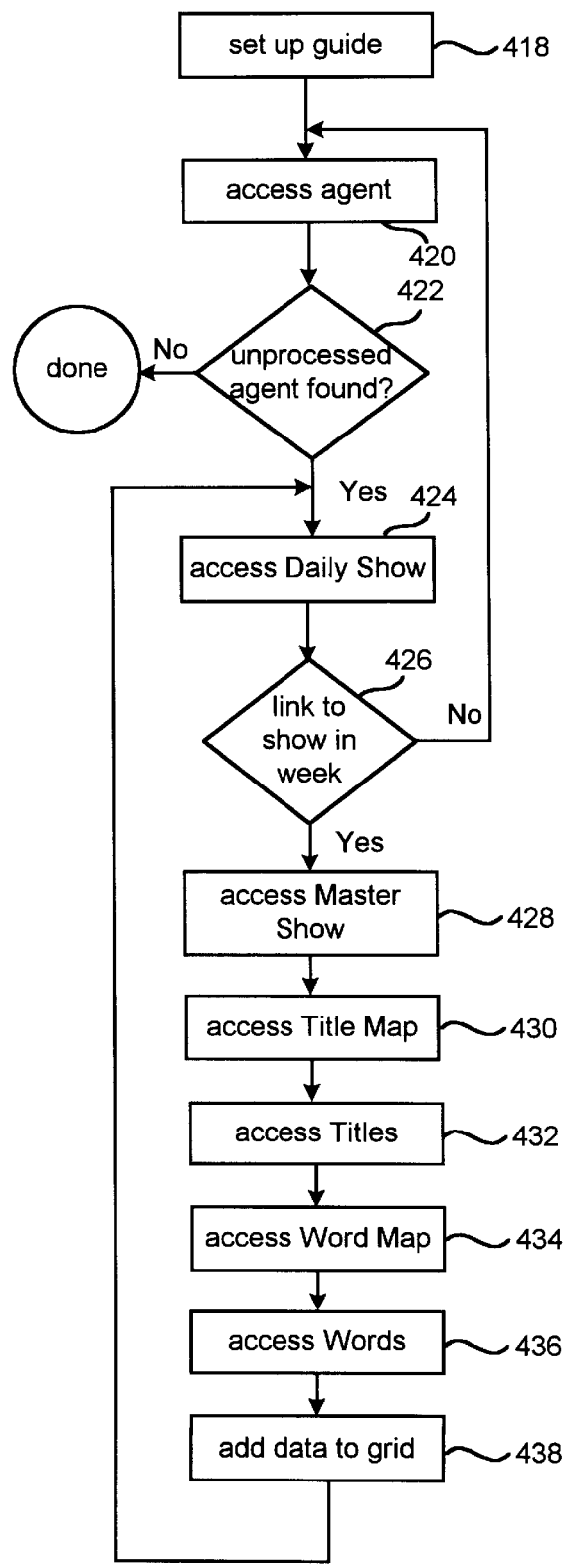
FIG. 9 is a flow chart depicting the method for providing a guide listing shows by agent.

FIG. 9 depicts the steps taken by the system to provide the agent grid. In step 418, the guide is set up without placing data in the grid. In step 420, the system accesses Agents database 486 and looks for an agent designated by the user which has not been processed yet. If no such agents are found, the method is done. If an unprocessed agent is found, then in step 424 the record associated with that agent in Agent database 286 is used to access Daily Show database 264. If the agent does not include a pointer to a record in Daily Show database 264 then the system loops back to step 420, otherwise, the system utilizes the pointer for the record found in Daily Show database 264 to access Master Show database 266 in step 426. In step 430, the master show database record is used to access the appropriate title in Title Map database 274 and in the Title database 276 (step 432). Using one or more pointers from Title database 276, the system accesses the Word Map database 288 in step 434. Using the offset from Word Map database 288, the system accesses Words database 290 in step 436. In step 438, the title of the show is placed in the appropriate column and row of the grid, and the system loops back to step 424. It is contemplated that one agent may be used to locate more than one show. Thus, a record in the Agents database 286 may have more than one pointer to Daily Show 264. If there is a second pointer to Daily Show 264, and when the system loops back to step 424, the second pointer will be accessed and the system will proceed to step 428. If there isn't another pointer, then the system loops back to step 420. Thus, steps 424 through 438 are performed once for each show found by a particular agent. After all the shows found by a particular agent are added to the grid, the system loops back to step 420 and processes the next agent, if any.

FIG. 10 illustrates the steps utilized by the system when the user requests a topics guide. In step 450, the system sets up the guide without inserting data. In step 452, the system uses the Topics Alpha database 272 to alphabetically access Topics database 270 to find an unprocessed topic. If no such topics are found (step 454) then the method is done. If an unprocessed topic is found, the system access Topics database 270 in step 456. Based on the pointers from Topics database 270, the system accesses Words Map database 288 and Words database 290 in step 458. For each topic found, Topics Alpha database 272 includes a pointer to Daily Show database 264 for each show in Daily Show database 264 that is within the specific topic. In step 460, Daily Show database 264 is accessed to identify a show time and channel for a show within the chosen topic. If there is a link that hasn't been processed then the system processes that one link to find the record for the one particular show and uses the record to access the Master Show database in step 464. The record in Master database 464 is used to access Titles Map database 274 in step 466 and Titles database 276 in step 468. Titles database 276 is used to access Word Map database 288 in step 470 and Words database 290 in step 472. The show times, channel and title are added to the grid in step 474. After step 474, the system loops back to step 460 and accesses Topics Alpha database 272 and Daily Show database 264 to see if there are any more pointers from Topics Alpha database 272 to Daily Show database 264. If there are more pointers from Topics Alpha database 272 to Daily Show database 264 for the topic under consideration that has not been processed, the system repeats steps 464 to 474 for all of those unprocessed pointers. Thus, steps 460–474 are performed once for each show within a category. If there are no more unprocessed pointers, then the system loops back to step 452 and accesses the Topics Alpha database 272 and Topics Database 270 to determine whether there are any more topics that had not been processed. An example of a grid built with the steps of FIG. 10 are shown in FIG. 25.

FIG. 11 is a flow chart of the method for providing a titles guide. The steps of FIG. 11 are performed in response to the user choosing a titles guide from the pop-up menu after the user has chosen the guides button 238. In step 476, the system sets up the guide without inserting data. In step 478, the system alphabetically accesses Title Alpha database 280. In step 480, the system determines whether there are any unprocessed titles. If there are no more titles to process, the system is done. If there are more titles to process, the system uses the pointer from Titles Alpha database 280 to access Titles Map database 274 (step 482) and Titles database 276 (step 484). Titles database 276 includes a number of pointers to the Words database 290 to store the actual words of the title and also includes a pointer to Daily Show database 264. Step 488 attempts to access Daily Show database 264. If there is no pointer to Daily Show database 264 in the relevant time period, then the system loops back to step 478 and chooses another title in the alphabetical listing of titles. If there is a show in the relevant time period, then the system accesses the Word Map database 288 in step 492 and the Word database 288 in step 494. In the disclosed embodiment, Daily Show database 264 includes data for a two week period. In step 496, the data from Daily Show database 264 is used to place the title, channel and/or time into the grid. After step 496, the system loops back to step 478 to access the next title. When the method of FIG. 11 is done, the system has built a grid which lists titles in alphabetical order and indicates the show times. An example of a grid built with the steps of FIG. 11 is shown in FIG. 24.

Figure 12:
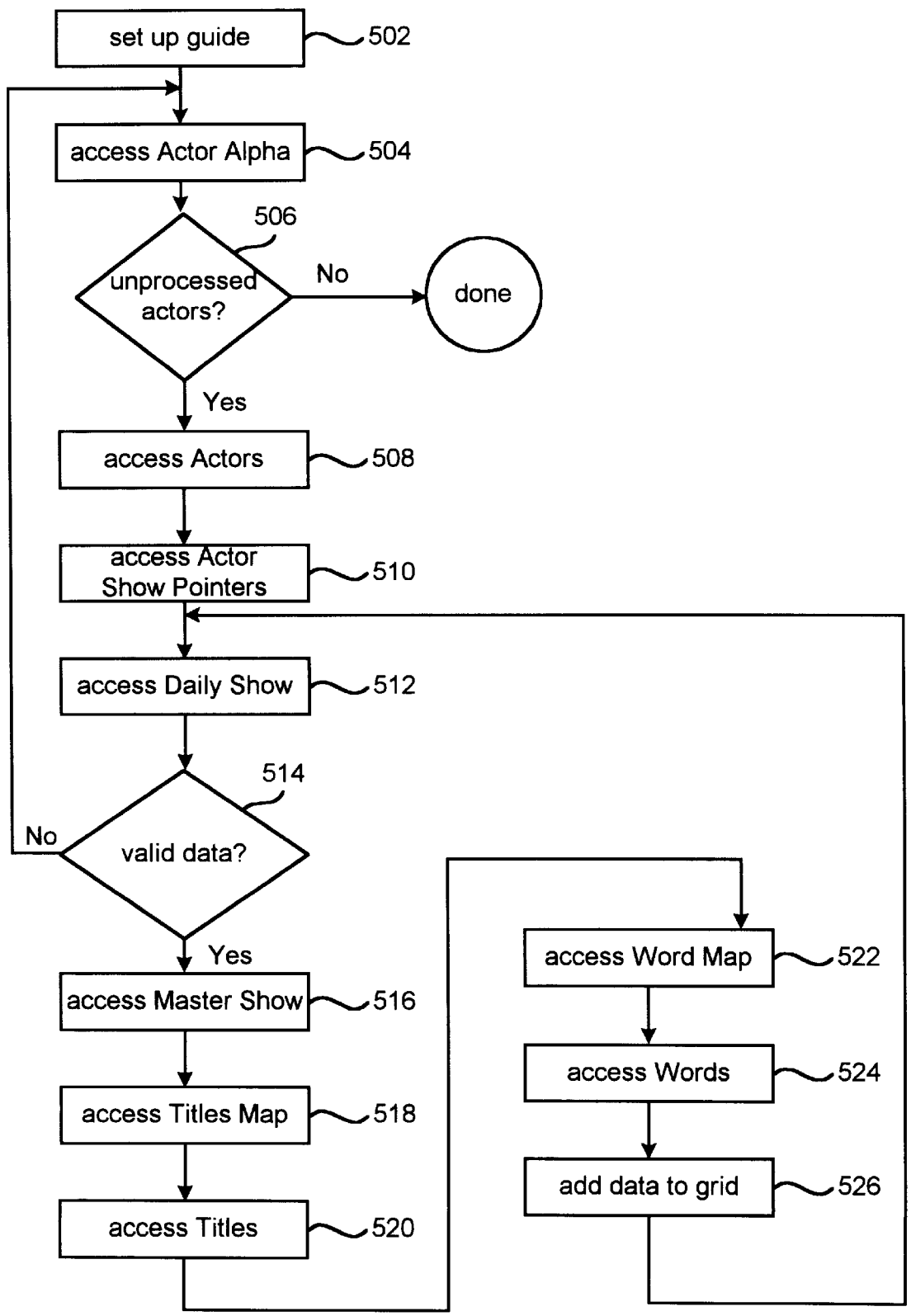
FIG. 12 is a flow chart depicting the method for providing a guide listing shows by actor/actress names.

FIG. 12 depicts the steps performed by the system to set up the actor/person guide. The steps of FIG. 12 are performed in response to the user choosing the people guide from the pop-up menu after selecting the guides button 238. The grid that results from the steps of FIG. 12 is similar to the grid of FIG. 25, except that actor's names are listed instead of topics. In step 502, the guide is set up without inserting data. In step 504, the system accesses Actors Alpha database 284. The system accesses each record in Actors Alpha database 284 alphabetically. Step 504 includes accessing one record. If all the records have already been processed (step 506) the system is done. If there is a record to process, then in step 508, a pointer from the accessed record in Actors Alpha database 284 is used to access Actors database 282. In step 510, the pointer from Actors database 282 is used to access Actors Show Pointers database 298.

In step 512, the Actors Show Pointers database 298 is used to access Daily Show database 264. If valid data is found in Daily Show database 264 (step 514), then the system proceeds to step 516; otherwise, the system loops back to step 504. That is, if the particular actor being considered is in a show in the two week window of data stored in Daily Show database 264, then the method proceeds to get the information for that actor; otherwise, the system loops back to step 504 and another actor's name is accessed. In step 516, the record in Daily Show database 264 is used to access Master Show database 266. In step 518, Master Show database 266 is used to access Titles Map database 274 (step 518) and Titles database 276 (step 520). Titles database 276 is used to access Word Map database 288 (step 522) and Word database 290 (step 524). In step 526 the actor's name (if appropriate) and time/channel information (if appropriate) is added to the grid. The system then loops back to step 512 and accesses Daily Show database 264 another time to determine if there are any more pointers for additional shows associated with the actor under consideration. If so, the system repeats steps 516 to 526; otherwise, the system loops back to step 504 and accesses another actor's record.

Figure 13:
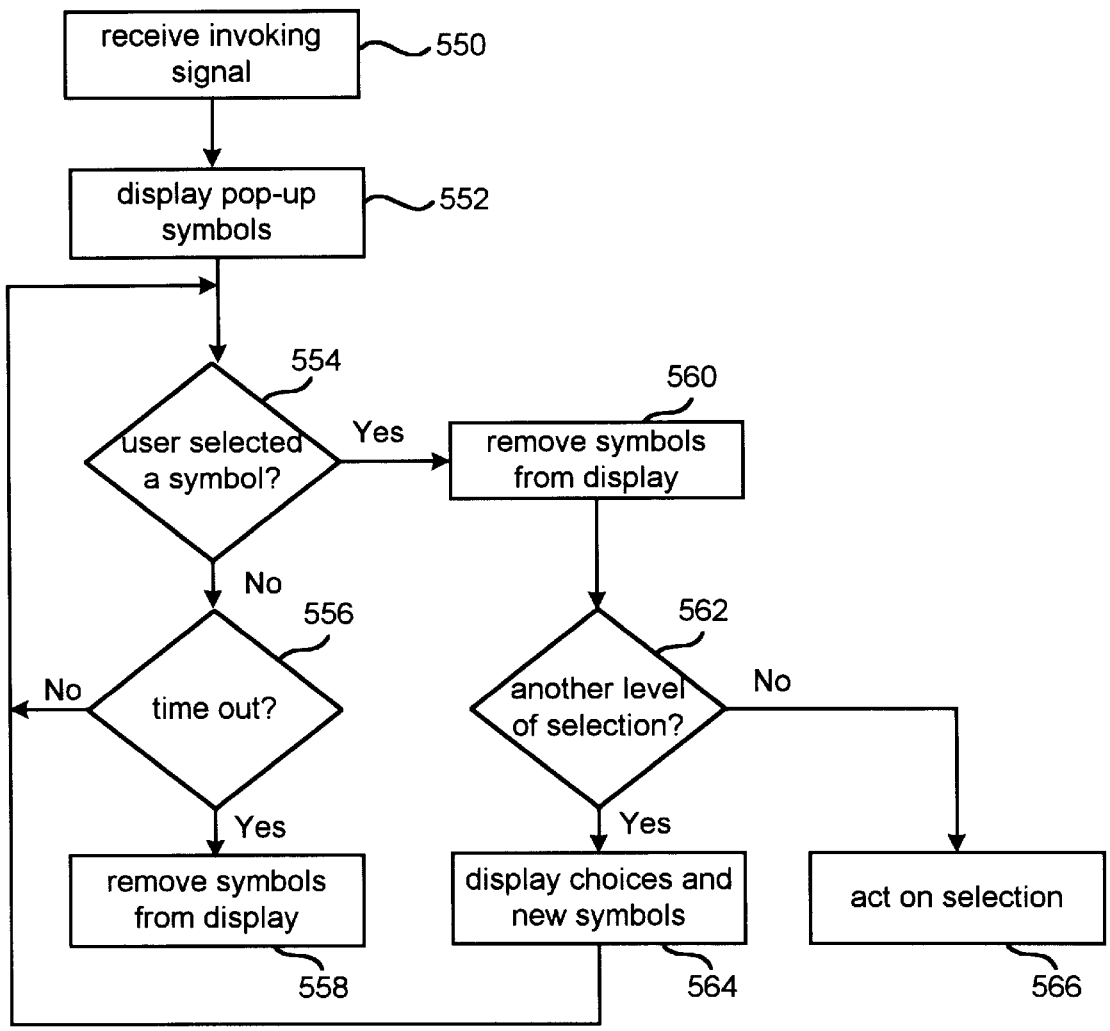
FIG. 13 is a flow chart describing a method of navigating through a user interface and selecting items.

Some embodiments of client computer 100 include remote control 148, but no keyboard or pointing device. Thus, the electronic program guide must be designed to allow a user to easily interface with the guide without the use of a keyboard and standard pointing device. FIG. 13 describes one method for allowing a hand held remote to be used to select various options on a user interface. Although this method is described with respect to the electronic program guide discussed above, this method can be used with user interfaces for other hardware and software devices. The method is based on using a button on the remote to activate a plurality of pop-up symbols on the screen. Each of the symbols on the screen correspond to an item on the remote control and to an option on the screen; thereby, allowing the user to select an option with the available items on the remote control. To help illustrate the steps of FIG. 13, it will be assumed that at the time the steps of FIG. 13 are being performed, the guide of FIG. 4 is being displayed. As previously discussed, buttons 228, 230, 232, 234, 236 and 238, as well as grid 224 and advertisement 222 are available as options on the guide of FIG. 4. Each of the options are designated as a selection item. That is, they are an item on the display that can be selected. Examples of selection items include pop-up menus, input areas, text fields, lists, buttons, titles, alphanumeric characters, etc. It is assumed that the user will choose one of the selection items of FIG. 4 when the method of FIG. 13 is performed.

In step 550, the system receives an invoking signal. The invoking signal comprises the user invoking an activation input item on an input device. The input device can be any number of appropriate devices used to provide an input to a computer or other hardware apparatus including a keyboard, number pad, control panel, dial, etc. The preferred input device is a remote control. The input device has a number of input items. One of the input items is designated as an activation input item. One example of an appropriate activation input item is the zero key on the remote control. If the remote control has another key available through the activation input item, then that key can be used instead of the zero key, for example, the page up key or a volume key can be used as the activation input item. In the case of a button, invoking the activation input item means just pressing the button so that the remote control can provide a signal to client computer 100.

Figure 14:
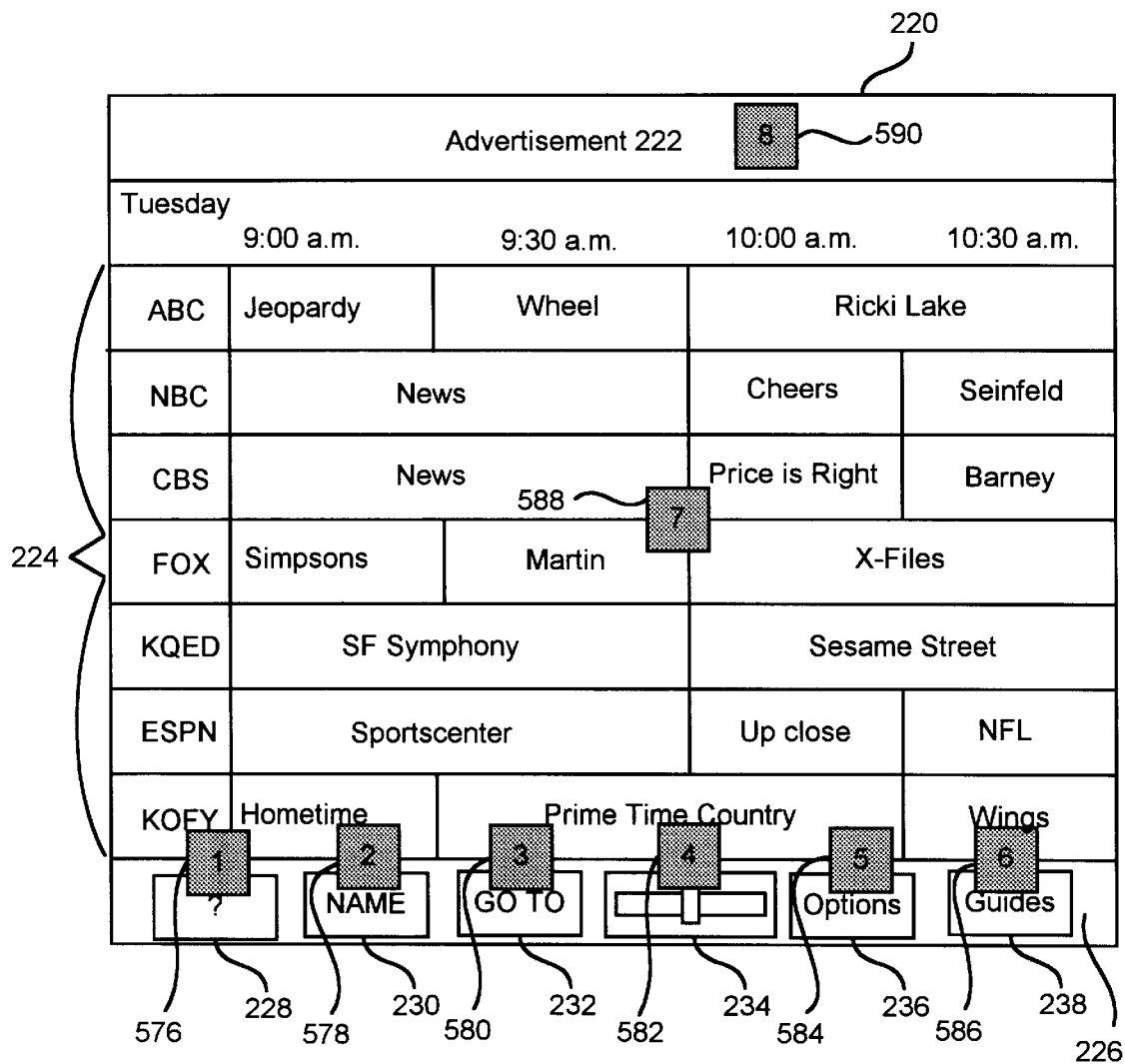
FIG. 14 depicts a guide that can be used with the method of FIG. 13.

In response to receiving the invoking signal from the user's invoking of the activation input item, the system displays pop-up symbols in step 552. FIG. 14 shows the screen of FIG. 4 with eight pop-up symbols 576, 578, 580, 582, 584, 586, 588 and 590. Each of the pop-up symbols correspond to both an input item on the input device and at least one selection item. For example, pop-up symbol 576 corresponds to the numbered one button on remote control 148 (input item) and to help button 228 (selection item). Pop-up symbol 578 corresponds to the numbered two button on remote control 148 and name button 230. Pop-up symbol 580 corresponds to the numbered three button on remote control 148 and go to button 232. Pop-up symbol 582 corresponds to the numbered four button on remote control 148 and slider 234. Pop-up symbol 584 corresponds to the numbered five button on remote control 148 and options button 236. Pop-up symbol 586 corresponds to the numbered six button on remote control 148 and guides button 238. Pop-up symbol 588 corresponds to the numbered seven button on remote control 148 and to grid 224. Pop-up symbol 590 corresponds to the eight button on remote control 148 and to advertisement 222. In the example of FIG. 14, each of the pop-up symbols are numbers, wherein each number is the number for the corresponding button on remote control 148. Thus, it is possible to access the selection items of FIG. 14 with a remote that only includes a keypad with numbers 0 through 9. Providing client computer 100 with a remote only including a keypad would lower the manufacturing cost of the system. Note that the pop-up symbols may partially occlude a selection item; however, the selection item is not completely erased from the screen and the user will be able to see at least part of the selection item below or next to the pop-up symbol corresponding to the selection item. In one embodiment, the step of displaying pop-up symbols includes displaying help information for the pop-up symbols.

In step 554, the system determines whether the user has selected one of the pop-up symbols. By selecting a pop-up symbol it is meant that the user pushed a button (invoked an item) on the remote control corresponding to a pop-up symbol. In systems that have a keyboard or pointing device, the user can select a pop-up symbol by clicking on the symbol or entering a valid keystroke. If the user has not selected a symbol, the system determines whether the system has timed out (step 556). The time out period is a predetermined number of seconds, for example, ten seconds. If the time out period has passed then the pop-up symbols are removed from the display in step 558. If the time out period has not passed, the system loops back to step 554 to see if the user selected a symbol. If, in step 554, the system determines that one of the symbols was selected by the user pressing the corresponding input item on the input device, then the system removes the pop-up symbols from the display in step 560. In step 562, the system determines whether there is another level of selection. For example, if the user selected help button 228, there may be no further level selection. That is, the system would act on the user's selection by displaying a help dialog in step 566. Performing the function designated by a selection item is called activating the selection item.

Figure 15:
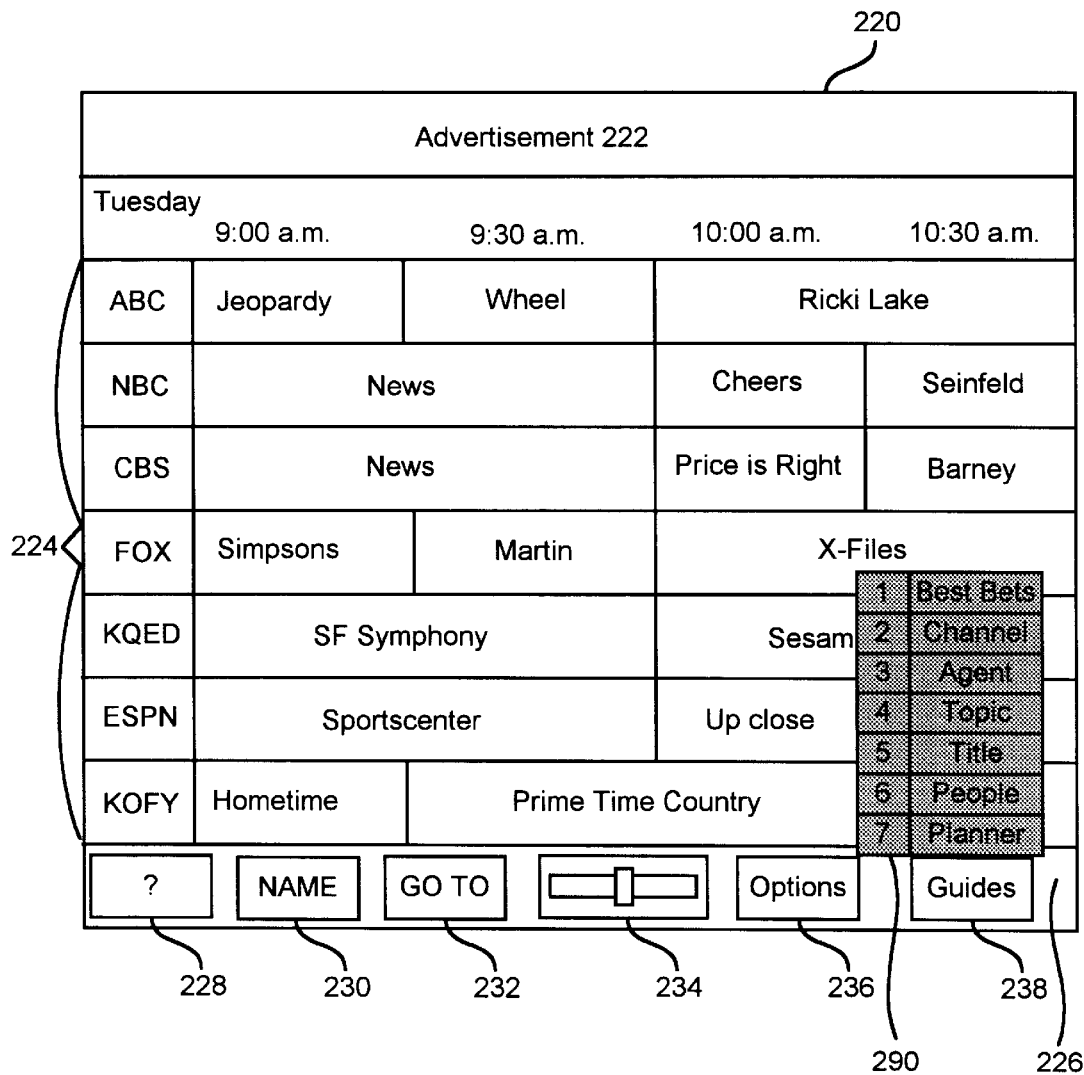
FIG. 15 depicts the guide of FIG. 14 with a pop-up menu.

If the user selected guides button 238, the system would next need to display a pop-up menu for further selection. The pop-up menu is another level of selection. Since there is another level of selection, the system displays new selection items (e.g. pop-up menu corresponding to guides button 238) and displays new pop-up symbols for the new selection items in step 564. FIG. 15 shows the display of FIG. 14 after step 564, assuming the user selected guides button 238. FIG. 15 shows pop-up menu 290 with seven choices: best bets, channel, agent, topic, title, people and planner. Next to each selection item is a corresponding pop-up symbol. The pop-up symbols are the numbers 1, 2, 3, 4, 5, 6 and 7.

After step 564, the system loops back to step 554 to determine whether the user has selected one of the pop-up symbols. Again, if the user does not select one of the pop-up symbols within the predetermined amount of time, the symbols will be removed from the display in step 558. In the case of the pop-up menu 290, if the user does not select the symbols within the predetermined amount of time, the pop-up menu 290 will also be removed from the display. If the user selects from one of the selection items on the pop-up menu 290, then the system will act on that selection (activate the selection item) in step 566 because there is no other levels of selection. Step 566 may correspond to the methods of FIGS. 8 through 12, depending on the user's choice.

The method of using pop-up symbols and an activation input item to allow a remote control to operate the user interface can also be used to allow a user to efficiently enter alphanumeric information. For example, when performing the steps of FIG. 3 or providing information after selecting buttons 228, 230, 232, 234, 236 or 238, a user may need to enter alphanumeric characters.

Figure 16:
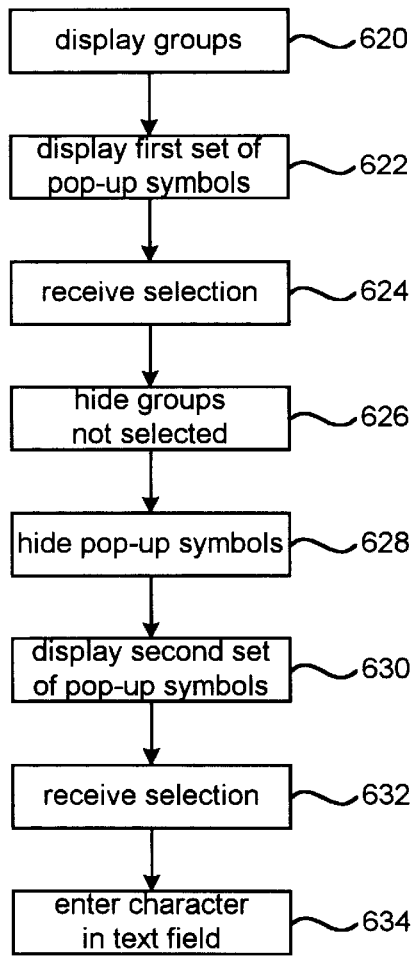
FIG. 16 is a flow chart describing a method for entering alphanumeric characters.
Figure 17:
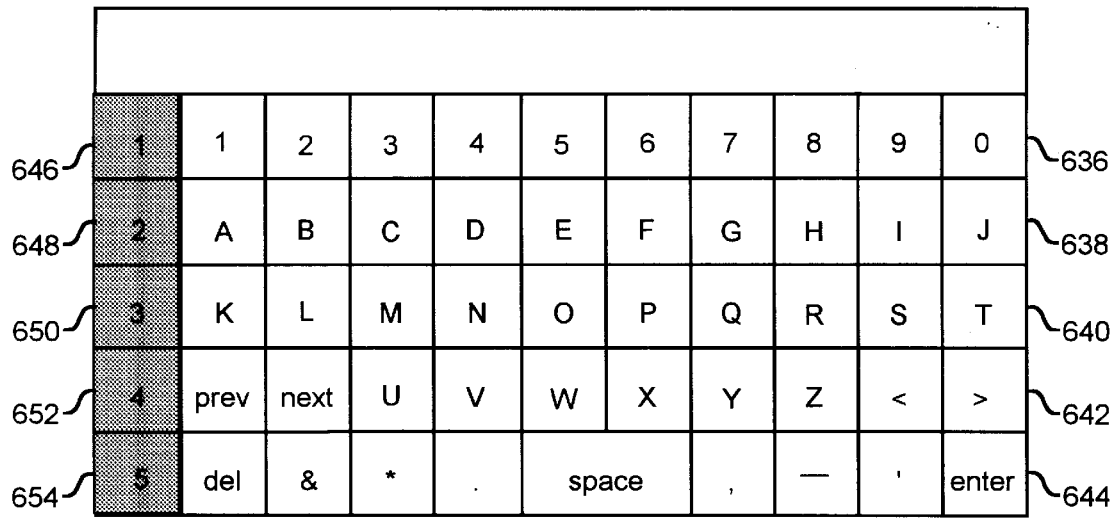
FIG. 17 depicts a screen for use with the method of FIG. 16.
Figure 18:
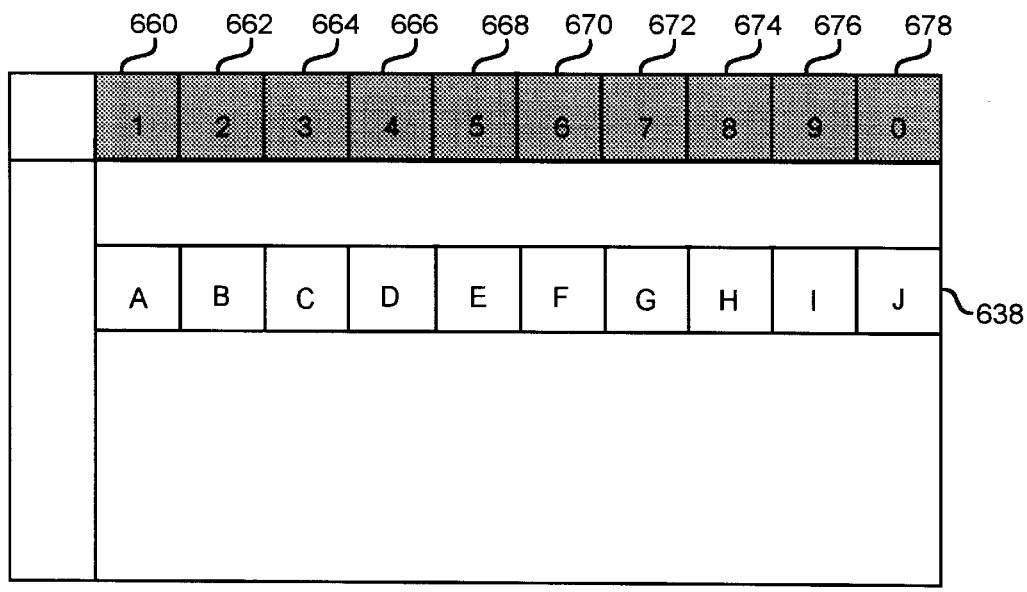
FIG. 18 depicts a screen for use with the method of FIG. 16.

FIG. 16 depicts the method of using the pop-up symbols described above to allow a user to enter alphanumeric characters. The alphanumeric characters are divided into a number of groups. The size of the groups can vary. However, it is preferred that the number of characters in each group correspond to the number of input items available to the user. For example, if the remote control has a keypad (0–9) and it is desired that the user be able to interact with the user interface based only on the keypad, then the group should contain no more than ten items. In step 620 the groups of characters are displayed. FIG. 17 depicts an exemplar display of five groups 636, 638, 640, 642 and 644. Group 636 includes the characters "1, 2, 3, 4, 5, 6, 7, 8, 9, 0." Group 638 contains the characters "A, B, C, D, E, F, G, H, I and J." Group 640 includes the characters "K, L, M, N, O, P, Q, R, S and T." Group 642 includes previous, next, "U, V, W, X, Y, Z<and >." Group 644 includes "[delete], &, *, ., [space], [comma], -, ', and [enter]." In step 622, a first set of pop-up symbols are displayed. FIG. 17 shows five pop-up symbols 646, 648, 650, 652 and 654. Each pop-up symbol corresponds to an input item on the remote control and one of the groups. For example, pop-up symbol 646 corresponds to group 636 and the numbered one button on remote control 148, pop-up symbol 468 corresponds to group 638 and the numbered two button on remote control 148, etc. In step 624, the system receives a selection from the user. The user can select any of the pop-up symbols. In one option, if the user does not select a symbol within a predetermined amount of time, the entire dialog, or just the pop-up symbols, can be removed from the display.

After the system has received a selection of one of the five pop-up symbols, the system hides the groups that are not selected. For example, assume that the user selected pop-up symbol 648, thereby, selecting group 638. In step 626, groups 636, 640, 642 and 644 are hidden. The step of hiding the groups could mean erasing the groups from the display, shading the groups, changing the color of the unchosen groups or some other action to designate which group are not selected. In step 628, the pop-up symbols 646, 648, 650, 652 and 654 are hidden. The step of hiding the groups not chosen can include highlighting the chosen group because the effect is to call attention to the chosen group. In step 630, the system displays a second set of pop-up symbols: 660, 662, 664, 666, 668, 670, 672, 674, 676 and 678. Each of the second set of pop-up symbols corresponds to one member of group 638. For example, pop-up symbol 660 corresponds to the letter A from group 638 and to the numbered one button on remote control 148, pop-up symbol 662 corresponds to the letter B from group 638 and to the numbered two button on remote control 148, etc. In step 632, the system receives a selection from the user. The user can select any of the pop-up symbols 660–678. Once receiving the selection in step 632, the system enters the appropriate character in the appropriate text field in step 634. For example, if the user was in the process of setting up a user name in step 202 of FIG. 3, then step 634 includes entering the chosen letter into the appropriate position of the user's name. Note that the method of FIG. 16 assumes two levels of selection. The first level of selection includes choosing a group and the second level includes choosing a member of the group. It may be possible that the number of options does not fit in two levels of selections. Thus, the method can be adapted to choose from multiple levels of selections. For example, choosing from a long list of items.

Figure 19:
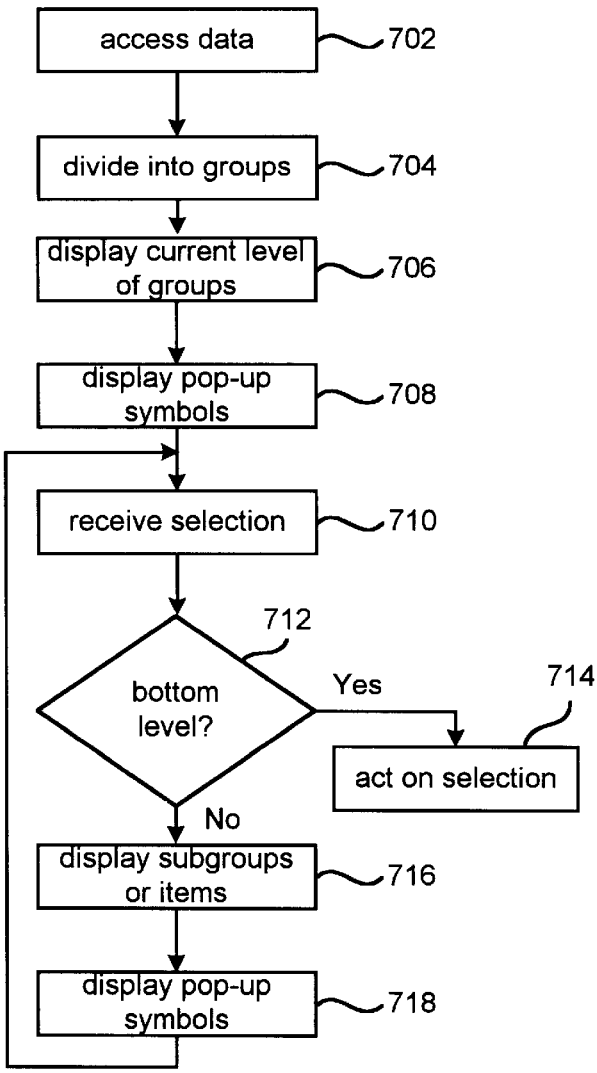
FIG. 19 is a flow chart describing a method for selecting an item from a list.

FIG. 19 illustrates the method of using the pop-up symbols to pick an item from a list using one or more levels of selection. A user may want to select from a list when choosing a particular topic to mark as liked or disliked, choosing a particular title, choosing an actor name, etc. For example, when presented with the screen of FIG. 4 and the user selects go to button 232, the user has the option to go to a channel/call-sign/title/topic/actor. To enter the desired channel/call-sign/title/topic/actor the method of FIG. 16 can be used to type in characters or the method of FIG. 19 can be used to select from a list. Any other situation which allows the user to select from a list of items can also use the method of FIG. 19, including applications unrelated to the electronic program guide.

The general method of selecting from a list is to divide the list of items into groups of nine items and display a list of nine group identifiers on the screen. When the user selects one of the groups, the chosen group of items is divided by nine to create a new set of nine subgroups, each subgroup having a subgroup identifier. This process continues until there are nine or fewer items in a chosen subgroup and the actual items can be chosen. In one embodiment, at the bottom level the user can use arrow keys to navigate among the nine choices and use the "OK" key to select one of the items.

In step 702 of FIG. 19, the data containing the items to be listed is accessed. If the user is performing the go to call sign function, then the data access would be from Call Sign database 260. If the user was attempting to use the go to titles function, the databases access would include Titles Alpha database 280, Titles Map database 274, Titles database 276, Word Map database 288 and Words database 290. All of the items that can be displayed in the list are accessed and those items are divided into groups in step 704. The number of groups depends on the number of buttons on the remote control that are available to the user. In a preferred embodiment, the method of FIG. 19 is preformed only using the keypad. After activating the pop-up symbols using the zero button, the zero button will be used to change levels between subgroups and supergroups as will be explained below. Thus, nine keys from the keypad are remaining for selection among groups. The data is divided into nine groups. Each of the groups are then therein broken into nine subgroups. Each of those subgroups are then broken into nine additional subgroups. The data is continually broken down into hierarchy of subgroups until a level where each of the groups contains nine or fewer items. In step 706, the current level of groups is displayed. When the user first accesses the list, the highest level of groups are displayed. The system does not actually display the entire group. Rather, the system displays a group identifier.

One example of a group identifier includes a starting descriptor and an ending descriptor. A starting descriptor describes the first element in a group and the ending descriptor describes the ending element in a group. For example, if the group is a list of titles, the starting descriptor may be the first two characters of the first title in the group and the ending descriptor may be the first two characters of the last title in the group. The number of characters used in a descriptor will depend on the amount necessary to uniquely describe each group. In addition to the starting/ending descriptors, a group identifier can be another character, symbol or image that designates the group.

Figure 20:
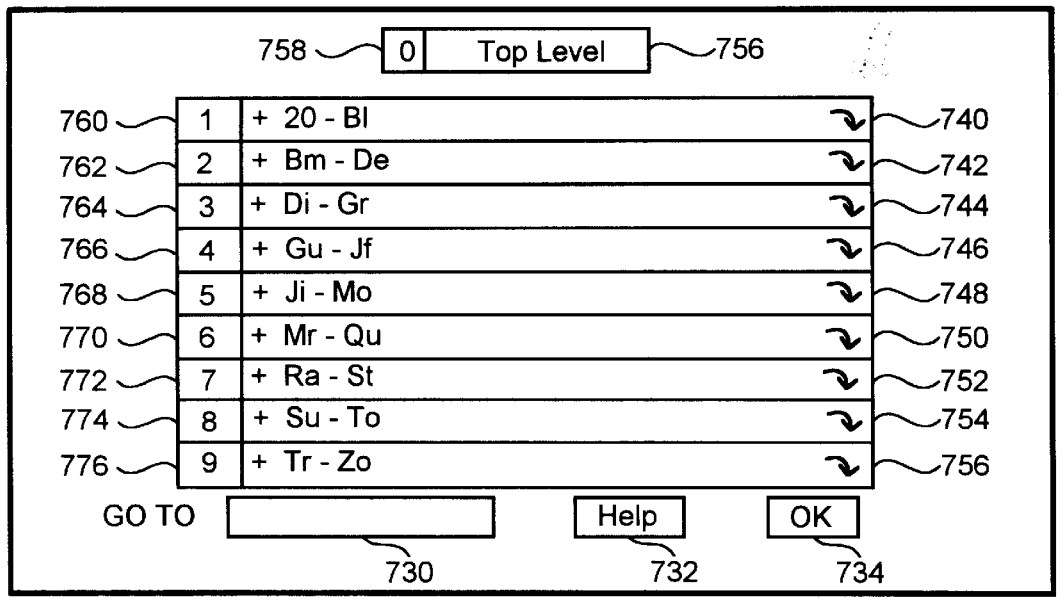
FIG. 20 depicts a top level menu for selecting items.

In step 708, a pop-up symbol is displayed for each group. FIG. 20 shows a screen depicting nine groups 740, 742, 744,

746, 748, 750, 752, 754 and 756. Each of the nine groups are associated with one of the pop-up symbols 760, 762, 764, 766, 768, 770, 772, 774 and 776. For example, pop-up symbol 760 corresponds to group 740 and the numbered one key on remote control 148. Group 740 is identified by a group identifier consisting of a starting descriptor "20" and an ending descriptor "Bl." Assuming that the user is attempting to access a list of titles, group 740 could include titles that start with the number 20 through titles that start with the letters "Bl." FIG. 20 also shows pop-up symbol 758 associated with level designator 756. In FIG. 20, level designator 756 indicates that the top level of the hierarchy of groups is being shown. FIG. 20 also shows go to field 730, help button 732 and "OK" button 734. In one embodiment, when the user selects a group, that group identifier is displayed in go to field 730. The user is then given the opportunity to verify the selection using the "OK" button. Another embodiment would not include the go to field 730. Rather, the user would only need to select the appropriate proper symbol.

Figure 21:
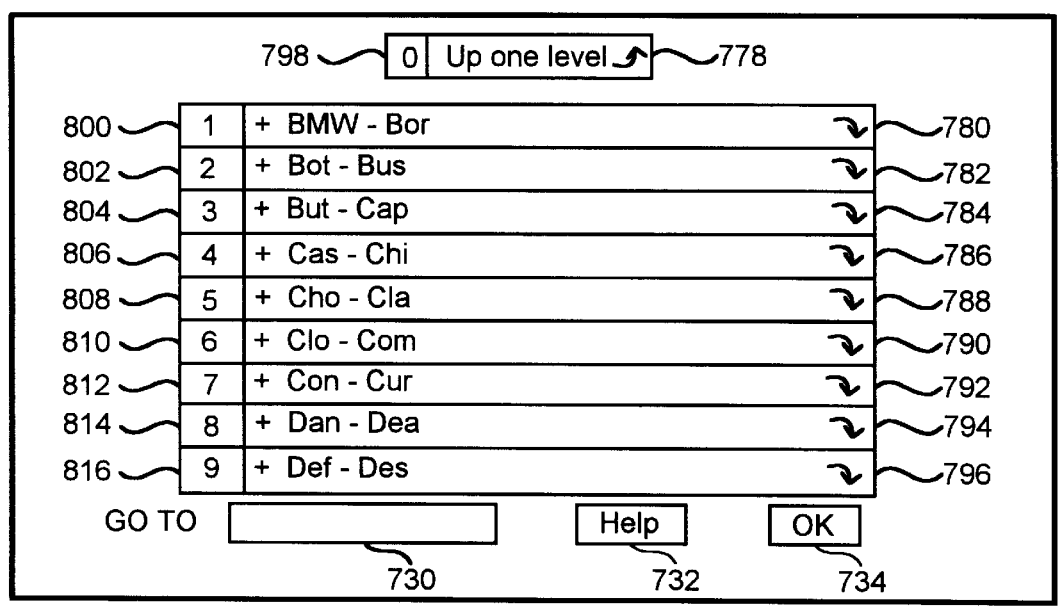
FIG. 21 depicts a second level menu for selecting items.

Looking back at FIG. 19, in step 710 the system receives a selection from the user. In step 712, the system inquires whether the groups being displayed on the screen is the bottom level of the hierarchy of groups. If it is, then the user selection is the final selection of the method and the selection must be acted on in step 714. Acting on the selection could include inserting a title or name into a text field or invoking the go to routine to go to the selected title or call sign. If it was not the bottom level (step 712) then the system displays the new level of subgroups in step 716. Looking at FIGS. 20 and 21, assume that a user selected pop-up symbol 762 corresponding to group 742. In step 716, the system would display the screen shown on FIG. 21 which includes subgroups 780, 782, 784, 786, 788, 790, 792, 794 and 796. Each of the groups listed above are subgroups of group 742. Group 742 is a supergroup of groups 780–796. Associated with group 780–796 are pop-up symbols 800, 802, 804, 806, 808, 810, 812, 814 and 816. For example, pop-up symbol 800 corresponds to group 780 and the numbered one button on remote control 148. Note that the group identifiers for group 780–796 contain starting descriptors and ending descriptors, however, the descriptors are three characters rather than two characters as in FIG. 20.

Figure 22:
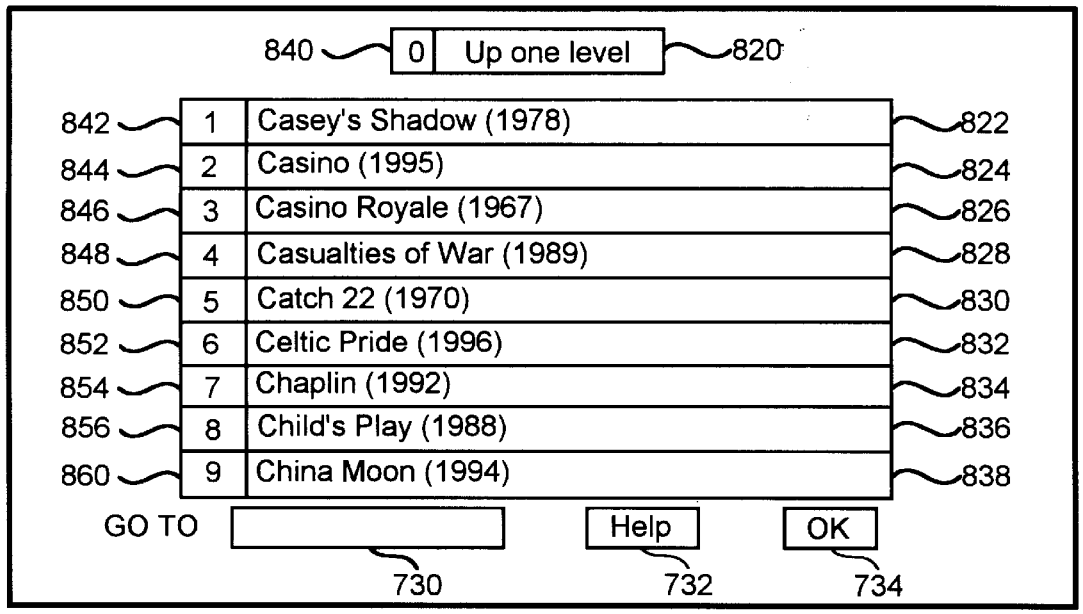
FIG. 22 depicts a bottom level menu for selecting items.

After the system performs step 716 to 718, the system loops back to step 710 and waits for a selection. After receiving a selection in step 710, the system again inquires whether this is the bottom level. In the current example being discussed, the system is not at the bottom level; therefore, step 716 and step 718 are performed and new subgroups and symbols are displayed. FIG. 22 shows the screen depicting the new set of subgroups (or items) and symbols. The list in FIG. 22 includes nine items 822, 824, 826, 828, 830, 832, 834, 836 and 838. Associated with the nine items are nine pop-up symbols 842, 844, 846, 848, 850, 852, 854, 856 and 860, After displaying the screen of FIG. 22 the system loops back to step 710 and receives a selection. In step 712, the system determines that it is at the bottom level of the group hierarchy and, in step 714, acts on that selection. As seen from FIG. 22, instead of listing group identifiers, the screen of FIG. 22 lists movies in alphabetical order. When the user picks one of the pop-up symbols, the associated movie is selected. Assuming that the user is accessing the list from a go to-title selection, when the user chooses a particular movie the system will display the scheduling information for that movie.

Figure 22A:
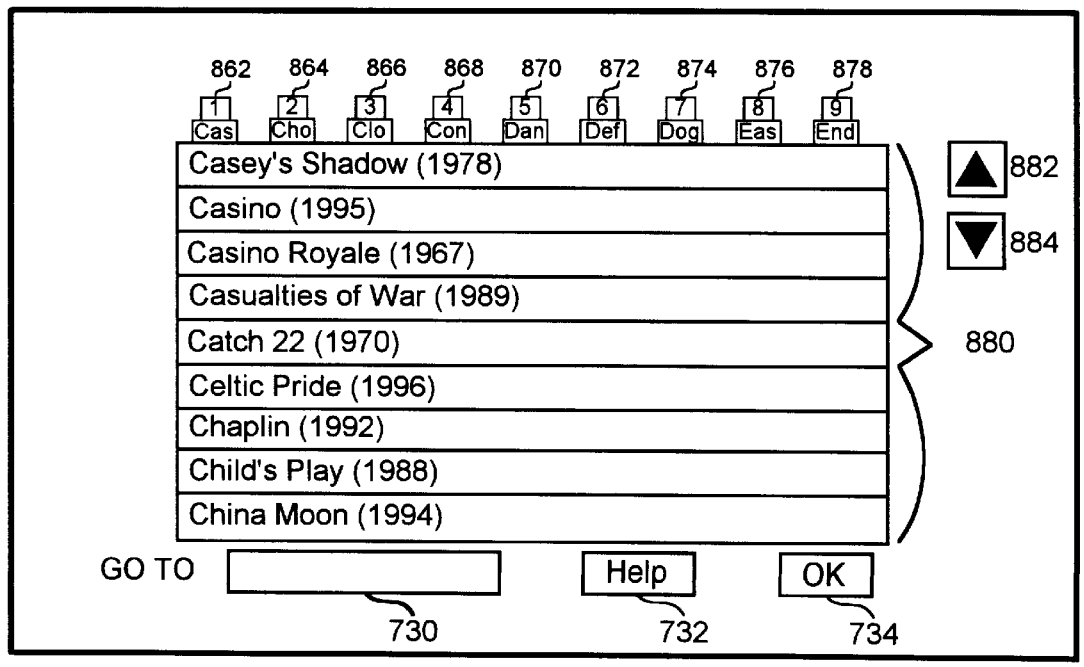
FIG. 22A depicts a menu for selecting items.

FIG. 22A depicts a second embodiment menu to be used in a second embodiment system for selecting an item from a list. The second embodiment system for selecting an item from a list can be used with the method of FIG. 19 and is similar to the embodiment described with respect to FIGS. 20–22 except for the format of the menus. The menu of FIG. A includes pop-up symbols 862, 864, 866, 868, 870. 872, 974, 976 and 878. Each of the pop-up symbols are associated with and are adjacent to a tab. Each tab is labeled with a group identifier. Pop-up symbol 862 is associated with the tab labeled "Cas", pop-up symbol 864 is associated with the tab labeled "Cho", pop-up symbol 866 is associated with the tab labeled "Clo", pop-up symbol 868 is associated with the tab labeled "Con", pop-up symbol 870 is associated with the tab labeled "Dan", pop-up symbol 872 is associated with the tab labeled "Def", pop-up symbol 874 is associated with the tab labeled "Dog", pop-up symbol 876 is associated with the tab labeled "Eas" and pop-up symbol 878 is associated with the tab labeled "End". Below the tabs is a list of nine titles 880, go to field 730, help button 732 and "OK" button 734. The group identifiers consist of the first three letters of the first member of the group. FIG. 22A also shows up arrow 882 and down arrow 884 which are used to navigate up and down the hierarchy of groups.

FIG. 22A shows a second level menu. The first level menu would include tabs showing the highest level of groups and no list of titles. By invoking the activation input item the user is provided with the pop-up symbols to enable selection if the user does not have a keyboard. If the user has a keyboard the user can simply type the letters of the group identifier to select a group. If the user has a pointing device, the user can click on a group. Alternatively, the user can use the up arrow and down arrow keys to navigate between the groups. After the system receives the user's selection of a group (e.g. step 710) the system display the second level menu of FIG. 22A. The first nine shows belonging to the group designated by the first tab are displayed in list 880. The user can choose one of the listed shows or one of the tabs. The selection can be made using pop-up symbols (additional symbols can be added for list 880), alphanumeric keys on a keyboard, a pointing device, the up/down arrow keys etc. When the user chooses a group for which their are no subgroups, the tabs may be left blank and the pop-up symbols would only appear next to list 880. Alternatively, the tabs can continue to display the previous level's group identifiers.

Figure 23:
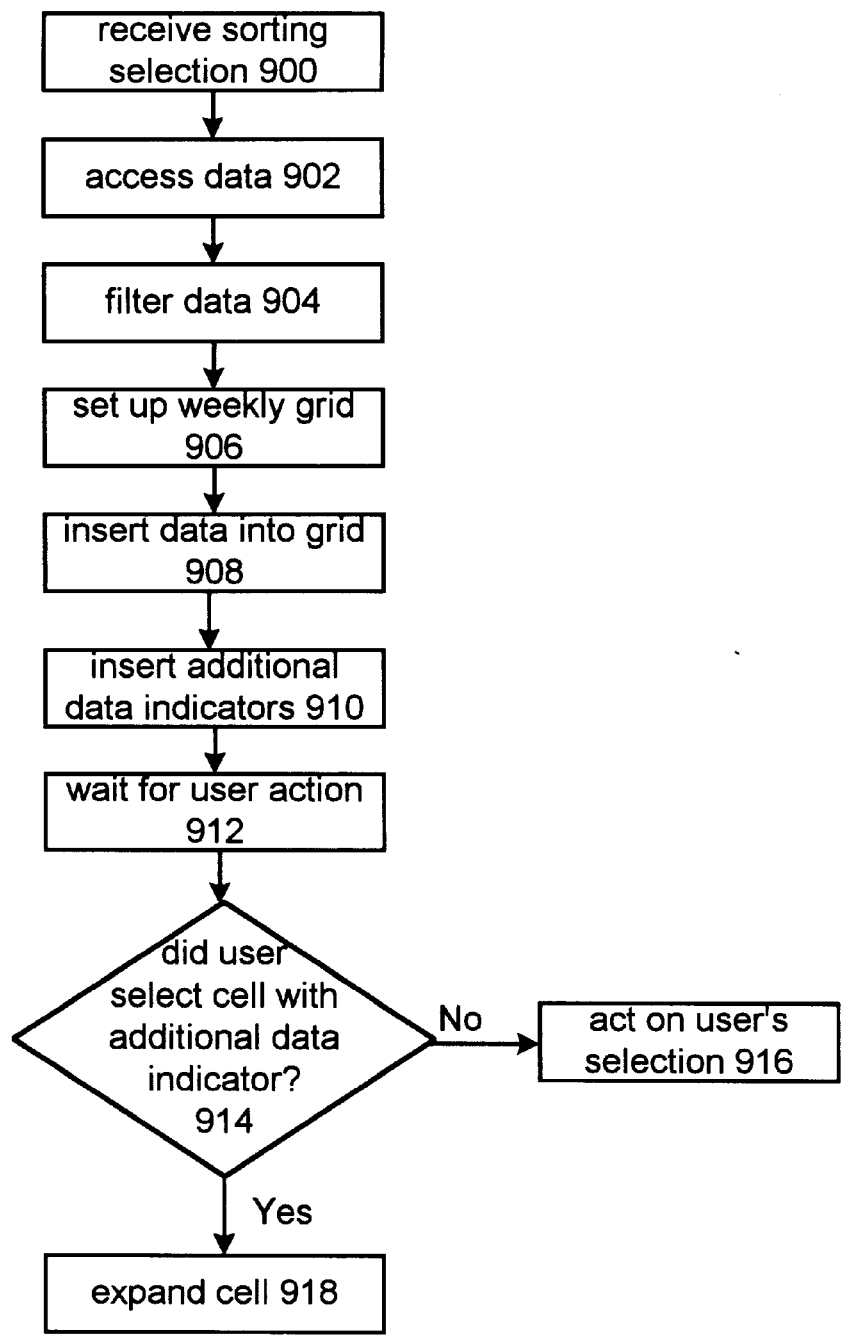
FIG. 23 is a flow chart for setting up a weekly planner grid.

The grid of FIG. 4 is one example of a format for displaying television scheduling information. Various other formats may also be useful for displaying programming information. For example, rather than showing a grid depicting two hours of programming information for all channels, it may be more desirable to show multiple days of information for a subset of shows or subset of channels. For example, a user may want to see three days of programming information at a time or a week's worth of programming information at a time. FIG. 23 depicts a method of providing a grid having multiple days of data. While the preferred embodiment discussed with respect to FIGS. 23–28 is a week's worth of data, grids with more or less days than seven is also within the spirit of the present invention.

In step 900, the system receives a sorting selection. That is, the user indicates the format for the grid. For example, the user can request two days' worth of data, a week's worth of data, etc. The default mode is a week's worth of data. The user also selects how to list the data. For example, the user can request data to be listed by title, by topic, by actor name or by agent. Additionally, the user can just request information on a predefined set of titles, for example, all shows marked as being liked by the user.

In step 902, the system accesses the data. If the user is requesting a guide showing program information for a week, then step 902 access data for a week. In step 904, the week's worth of data is filtered to meet the sorting selection criteria received in step 900. Thus, if the user only desired to see a listing of information for programs meeting the search agent, the appropriate data would pass through the filtering step 904. If the user asks for all titles in alphabetical order, then all the titles would pass through the filtering of step 904. In step 906, a weekly grid is set up with columns and rows. In step 908, data is inserted into the grid. FIG. 24 is an example of a weekly grid. The grid has nine columns: one column for each of the seven days of the week, one column for the title of the program and one column for the duration of the program. The grid is also divided into rows, where each row contains information for one show. Each row is divided into cells, one cell for each column. Thus, each cell is defined by an intersection of a row and column. If a listed show is to be broadcast during a particular day of the week, then show time and channel number are inserted in the appropriate cell corresponding to the row of the title and the column of the appropriate day of the week. The channel is indicated in parenthesis. For example, in FIG. 24 the movie "Animal House" is being broadcast for two hours and thirty minutes at 7:00 on channel 5 and 9:00 on channel 7. In one embodiment, a grid can be used to track whether a particular show is available on videotape and/or whether the user or a local outlet is in possession of that videotape.

FIG. 25 shows a weekly grid listing programs by topic. Row 924 lists the topic name. In the case of row 924, the topic is "Movies-Comedy." All the programs listed below that topic (and above the next topic name) are in that category. For example, the movie Animal House listed in row 926 is within the category "Movies-Comedy." FIG. 25 shows a second topic "Movies-Western" on row 928. The two movies listed in rows 932 and 934 are within the topic "Movies-Westerns." As with the grid in FIG. 24, each of the rows include a cell for each day of the week. If the show is being broadcast during a particular day of the week, then the cell would indicate the time and channel of broadcast.

If the user requests that the grid be listed by actor name or search agent, the formatting would be similar to FIG. 25. That is, there would be a row indicating an actor name or the search agent. In the rows beneath the search agent or actor name would be the list of titles for shows that include that actor or that meet the search agent.

Cell 936 of FIG. 25 indicates that the movie "Animal House" is being broadcast twice on Tuesday. First, the movie is being broadcast 8:00 p.m. on channel 12. Second, the movie is being broadcast at 9:00 p.m. on channel 7. If the show is being broadcast more than once on a particular day, the amount of space needed to depict the cell is increased; thereby, increasing the cell size for the entire row of cells as shown for row 926 in FIG. 25. In order to more efficiently utilize space, one embodiment of the present invention uses additional data indicators instead of multiple listings in a cell. That is, rather than using the format of cell 936, the system uses the format of cell 938 of FIG. 27. Cell 938 indicates the first time that the show is being broadcast (e.g. 8:00 p.m. on channel 12). Cell 938 also includes an additional data indicator 940. The additional data indicator shown in FIG. 27 is a lowercase "v"; however, various other symbols can be used. If the user had a pointing device, the user can click on the additional data indicator to request additional data. If the user does not have a pointing device, the user can use predefined keys on the keyboard or remote control. One alternative allows the user to use the pop-up symbols discussed with above. When the user selects the additional data indicator 940, cell 938 expands to the form shown in FIG. 28, showing the additional times and channels.

Looking back at FIG. 23 after the grid is set up, the system enters the additional data indicator 940 into the necessary cells in step 910 and waits for a user action in step 912. If the user selects an additional data indicator in step 914, then the appropriate cell is expanded in step 918 as indicated by FIGS. 27 and 28. Selecting an additional data indicator includes selecting the actual indicator symbol or selecting a cell containing the indicator symbol. If the user's action did not include selecting any additional data indicators, then the user's selection is acted on in step 916. Step 916 could include selecting a particular program, show time and/or channel for recording, viewing or marking, as well as any of the other options discussed above.

In one embodiment, a user can zoom in on a portion of the grid. For example, a predefined key on the remote control or an option for guides button 238, options button 236 or go to button 232 can be used to zoom in. If the user is viewing the grid of FIG. 25 and zooms in, the system would display the grid of FIG. 26 which depicts the shows of FIG. 25 but over a three hour window. The grid of FIG. 26 lists the columns as show times and includes channel numbers in the appropriate cells. Thus, FIG. 26 depicts an easy way to view show times for a particular show or set of shows. Note in FIG. 26 that the cells for "Gunsmoke" at 7:30 and 8:00 is blackened, with the number 4 shown in white. That is because Gunsmoke is being broadcast on channel 4 from 7:30 to 8:30 and the show has been preselected for taping. At the appropriate time, the electronic program guide will automatically cause (or program) VCR 104 to record Gunsmoke. If the show had been preselected for viewing, then the electronic program guide will automatically tune televison 102 to Gunsmoke at the appropriate time and channel.

Looking back at FIG. 4, it can be seen that not all of the potential television program listing information can be displayed on the screen at one time. FIG. 4, for example, only shows listings for seven channels. In order to help the user find the relevant information more quickly, it may be useful to filter the information such that the user is only presented with a subset of the television programming information. One means for reducing the set of information presented to the user is by using slider 234 (see FIG. 4).

Slider 234 has multiple selection levels. In the preferred embodiment, slider 234 has ten discrete positions, zero through nine, corresponding to ten selection levels. In other embodiments, slider 234 can have a continuum of selection levels rather than a predetermined number of discreet levels. For each selection level a predetermined set of selection criteria is used to filter the television programming information. Table 1 below provides one exemplar definition of selection criteria for each of the ten levels in slider 234.

TABLE 1

| Selection level | Criteria |
|---|---|
| 0 | only shows marked for viewing |
| 1 | add titles marked as favorites—really like |
| 2 | add shows selected by critic that have a topic user likes |
| 3 | add shows selected by agent that have a topic user likes |
| 4 | add all topics that user likes |
| 5 | add all titles, except titles marked as disliked |
| 6 | add shows selected by critic in a topic user doesn't care about |
| 7 | add shows selected by agent in a topic user doesn't care about |
| 8 | add all topics that user doesn't care about |
| 9 | add all remaining shows |

In the embodiment that utilizes the definitions of Table 1, each selection level is cumulative. That is, every show that would pass the filter in position zero would also pass the filter in positions one through nine. Any show that would pass the filter of position one would pass the filter for positions two through nine, and so on. Thus, the set of criteria for position zero are a subset of the set of criteria for position one, the set of criteria for position one is a subset of the subset of the set of criteria for position two, the set of criteria for position two is a subset of the set of criteria for position three, etc.

In one embodiment, when slider 234 is selected, a pop-up dialog box depicted in FIG. 29 will be presented to the user. The pop-up dialog box includes slider 234 and fifteen lights 950. In FIG. 29, the lights are organized into three column and five rows. Each row has three lights and pertains to a selection criteria based on user profile information. For the three columns, the left hand column represents what the user likes, the middle column represents what the user has no opinion of and the third column represents what the user dislikes. For example, row 952 graphically depicts the user's view list criteria, which indicates whether the user marked a particular program for viewing or not viewing (dislike). Row 954 graphically depicts the favorite's criteria (e.g. whether a show has been marked as like, dislike, don't care). Row 956 graphically depicts the critic's criteria. The system can store the critic's selections in a database. The data may include whether the critic liked, disliked or didn't care about a particular show. Row 958 graphically depicts the agent's criteria. Row 960 graphically depicts the topics criteria. Although the graphical depiction of the various criteria shows in FIG. 29 is useful, the present invention includes sliders without the graphical depiction or with a different graphical depiction.

When slider 234 is at selection level zero, the system filters all the data such that only shows that have been marked for viewing by the viewer would pass through the filter and be shown in the grid. At selection level zero, only light 962 is lit. When the slider is at selection level one, the system will filter shows to only display those shows marked for viewing and all shows whose titles are marked as favorites that the user likes. At selection level one, lights 962 and 963 will be lit.

The default position of slider 234 will be to the far right indicating that all shows will be displayed. As the slider is moved to the left, the filter becomes more restrictive, showing fewer and fewer shows that meet the criteria. The slider can be moved by pointing and dragging with a pointing device or selecting the selection level using a keypad (or other items) on a remote control or keyboard. In FIG. 29, level numbers 0, 5 and 9 are shown graphically. However, in other embodiments all ten levels can be shown or none of the levels can be shown. Alternatively, the lights 950 can be optional and only slider 234 is shown.

Figure 30:
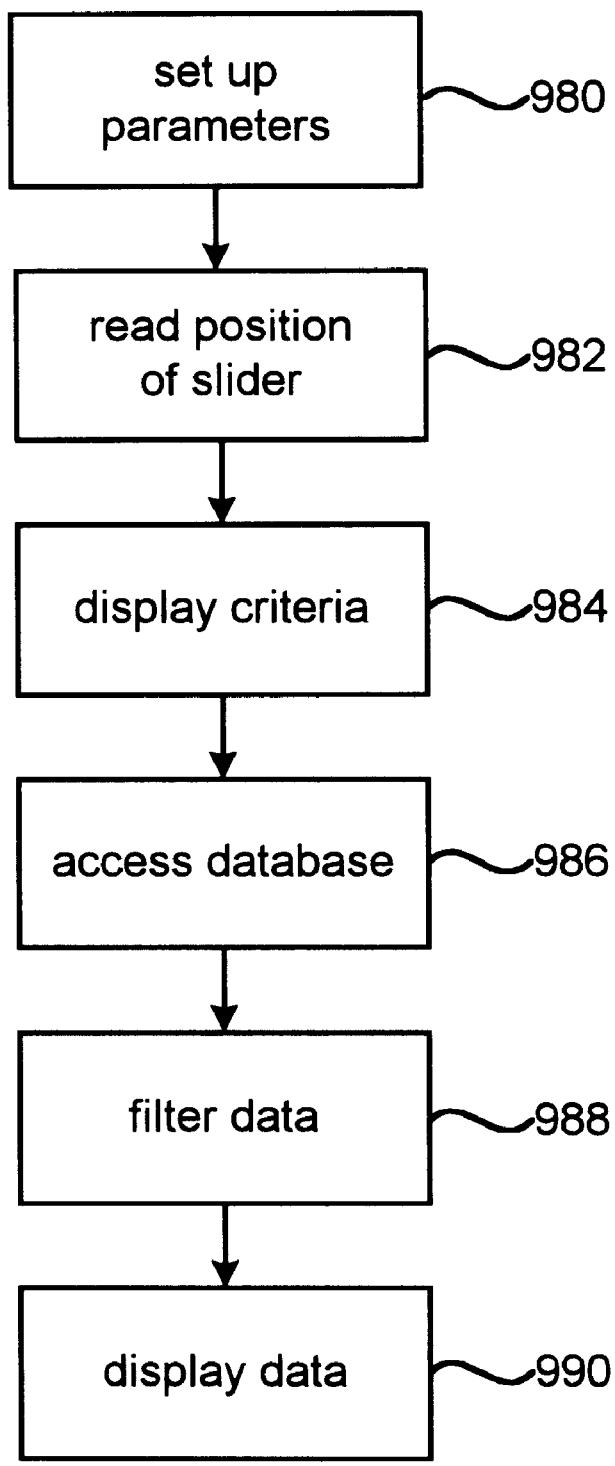
FIG. 30 is a flow chart explaining how the electronic program guide uses the slider.

FIG. 30 describes the method for providing slider 234. In step 980, the system sets up the parameters to be used by the different criteria. In one embodiment, step 980 includes performing the steps of FIG. 3. When a user selects slider 234 from the display in FIG. 4, the system will read the position of the slider in step 982. If the system is graphically displaying the criteria, then in step 984, the appropriate lights are lit up in step 984. If the system is not displaying the criteria, then step 984 would not be performed. In step 986, the databases of FIG. 5 are accessed to obtain the relevant universe of data. In step 988, that data is filtered according to the set of criteria defined by the position of the slider (e.g. see Table 1). To filter the data the system applies the appropriate criteria to the user preferences information, most of which was entered during one or more of the steps described in FIG. 3. In step 990, data meeting the criteria used to filter in step 988 is placed into a grid in any of the appropriate forms discussed above. This way, the user is only provided with a subset of information which is relevant to the user's tastes. With a small set of data to review, the user can more quickly find the information the user is interested in.

Slider 234 can be used to filter data for any of the guides discussed above, including the channel guide, agents guide, topic guide, title guide and people guide. Additionally, slider 234 can be used with 2 hour grid of FIG. 4, the weekly planner grid, other multiple day grids, the zoomed grid of FIG. 26, and any other suitable format.

After a guide is displayed, a user can re-position slider 234 and the necessary steps of FIG. 30 will be performed again taking into account the new criteria. Thus, a user can continue to move slider 234, viewing different sets of data, until the user receives the information that the user is interested in.

Although slider 234 is discussed in detail, the present invention can be implemented with other types of variable selection elements (e.g. a dial). A variable selection element is a hardware device or software element that can be used to select from one of a number of choices or selection levels. That is, there is more than simply an on/off selection.

The foregoing detailed description of the invention has been presented for purposes of illustration and description. It is not intended to be exhaustive or to limit the invention to the precise form disclosed, and obviously many modifications and variations are possible in light of the above teaching. The described embodiment was chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for presenting multiple days of scheduling information for a plurality of programs, said plurality of programs includes a specific program on a specific day at a specific time, the method comprising the steps of:

creating a table on a display, said table includes a plurality of rows and columns, said table includes a separate row for each program, said table includes a separate column for each day, said table includes a plurality of subsections, each subsection is defined by an intersection of an intersecting row and an intersecting column and represents data for a program corresponding to said intersecting row on a day corresponding to said intersecting column, said rows include a specific row associated with said specific program, said columns including a specific column associated with said specific day; and inserting program times into at least a subset of said subsections such that said specific time is added to a specific subsection, said specific subsection is defined by an intersection of said specific row and said specific column.

2. A method according to claim 1, wherein:

said table includes at least a separate column for each of seven consecutive days.

3. A method according to claim 1, further including the step of:

inserting channel identifiers into said subset of subsections.

4. A method according to claim 1, wherein:
said step of inserting includes adding an additional data indicator to said specific subsections; and
said method further includes the step of displaying at least one additional show time in response to a user selecting said additional data indicator.

5. A method according to claim 1, wherein:
said table lists titles for said programs; and
said titles are listed alphabetically.

6. A method according to claim 1, wherein:
said table lists titles for said programs; and
said titles are listed by category.

7. A method according to claim 1, wherein:
said table lists titles for said programs; and
said titles are listed by agent.

8. A method according to claim 1, wherein:
said table lists titles for said programs; and
said titles are listed by actor names.

9. A method according to claim 1, further including the step of:
accessing seven days of data, said step of inserting program times uses said seven days of data.

10. A method according to claim 9, further including the step of:
filtering said seven days of data.

11. A method according to claim 10, further including the step of:
receiving filtering criteria.

12. A method according to claim 1, further including the step of:
zooming in on a column of said table.

13. A method according to claim 1, wherein:
said table includes a column for displaying event duration.

14. A method according to claim 1, wherein:
said table includes a column for displaying whether a title is in possession.

15. A method according to claim 1, further including the step of:
updating said program times.

16. A method according to claim 1, further including the step of:
tuning a television to said specific program if a user selects said specific time from said table.

17. A method according to claim 1, further including the step of:
programming a video recorder to record said specific program if a user selects said specific time from said table.

18. A method according to claim 1, further including the steps of:
accessing seven days of data;
filtering said seven days of data; and
updating said program times in said table;
said table includes at least a separate column for each of seven consecutive days.

19. A processor readable storage medium having processor readable program code embodied on said processor readable storage medium, said processor readable program code for programming a processor to perform a method for presenting multiple days of scheduling information for a plurality of programs, said plurality of programs includes a specific program on a specific day at a specific time the method comprising the steps of:
creating a table, said table includes a plurality of rows and columns, said table includes a separate row for each program, said table includes a separate column for each day said, table includes a plurality of subsections, each subsection is defined by an intersection of an intersecting row and an intersecting column and represents data for a program corresponding to said intersecting row on a day corresponding to said intersecting column, said rows include a specific row associated with said specific program, said columns including a specific column associated with said specific day; and
inserting program times into at least a subset of said subsections such that said specific time is added to a specific subsection, said specific subsection is defined by an intersection of said specific row and said specific column.

20. A processor readable storage medium according to claim 19, wherein:
said table includes at least a separate column for each of seven consecutive days.

21. A processor readable storage medium according to claim 19, further including the step of:
inserting channel identifiers into said subset of subsections.

22. A processor readable storage medium according to claim 19, wherein:
said step of inserting includes adding an additional data indicator to said specific subsection; and
said method further includes the step of displaying at least one additional show time in response to a user selecting said additional data indicator.

23. A processor readable storage medium according to claim 19, wherein:
said table lists titles for said programs; and
said titles are listed alphabetically.

24. A processor readable storage medium according to claim 19, wherein:
said table lists titles for said programs; and
said titles are listed by category.

25. A processor readable storage medium according to claim 19, wherein:
said table lists titles for said programs; and
said titles are listed by agent.

26. A processor readable storage medium according to claim 19, wherein:
said table lists titles for said programs; and
said titles are listed by actor names.

27. A processor readable storage medium according to claim 19, wherein said method further includes the step of:
accessing seven days of data, said step of inserting uses said seven days of data.

28. A processor readable storage medium according to claim 30, wherein said method further includes the step of:
filtering said seven days of data.

29. A processor readable storage medium according to claim 31, wherein said method further includes the step of:
receiving filtering criteria.

30. A processor readable storage medium according to claim 19, wherein said method further includes the step of:
zooming in on a column of said table.

31. A processor readable storage medium according to claim 19, wherein said method further includes the step of:
updating said table.

32. An apparatus for presenting television scheduling information, comprising:

means for displaying a table having a set of seven columns, each of said seven column corresponding to a day of a week, said table further including an eighth column for listing titles;

means for filtering seven days of data; and means for inserting said filtered data into said table.

33. An apparatus according to claim 32, further comprising:

means for accessing said seven days of data.

34. An apparatus according to claim 36, further comprising:

means for sorting said data in said table by either category or title.

35. An apparatus for presenting television scheduling information, comprising:

a processor; and a memory in communication with said processor, said memory storing program code for programming said apparatus to perform a method for presenting multiple days of scheduling information for a plurality of programs, said plurality of programs includes a specific program on a specific day at a specific time, the method comprising the steps of:

creating a table for display, said table includes a plurality of rows and columns, said table includes a separate row for each program, said table includes a separate column for each day, said table includes a plurality of subsections, each subsection is defined by an intersection of an intersecting row and an intersecting column and represents data for a program corresponding to said intersecting row on a day corresponding to said intersecting column, said rows include a specific row associated with said specific programs said columns including a specific column associated with said specific day; and inserting show times into at least a subset of said subsections such that said specific time is added to a specific subsection said specific subsection is defined by an intersection of said specific row and said specific column.

36. An apparatus according to claim 35, further comprising:

a display in communication with said processor, said display is used to display said table.

37. An apparatus according to claim 35, wherein:

said table includes at least a separate column for each of seven consecutive days.

38. An apparatus according to claim 37, wherein said method further includes the steps of:

accessing seven days of data;

filtering said seven days of data; and sorting said seven days of data.

39. An apparatus according to claim 35, wherein said method further includes the steps of:

inserting an additional information symbol into said table if a particular show corresponds to two or more show times during a single day; and displaying said two or more show times if a user selects said additional information symbol.

40. An apparatus according to claim 35, wherein said method further includes the step of:

inserting channel identifiers into said subset of subsections.

41. A method for presenting multiple days of scheduling information for a plurality of video programs, said plurality of video programs includes a specific video program on a specific day at a specific time, the method comprising the steps of:

drawing a table, said table includes a plurality of rows and columns, said table includes a separate row for each video program, said table includes a separate column for each day, said table includes a plurality of subsections, each subsection is defined by an intersection of an intersecting row and an intersecting column and represents data for a video program corresponding to said intersecting row on a day corresponding to said intersecting column, said rows include a specific row associated with said specific video program, said columns including a specific column associated with said specific day; and inserting show times into at least a subset of said subsections such that said specific time is added to a specific subsection, said specific subsection is defined by an intersection of said specific row and said specific column.

* * * * *